US008150205B2

(12) United States Patent  (10) Patent No.: US 8,150,205 B2
Watanabe  (45) Date of Patent: Apr. 3, 2012

(54) IMAGE PROCESSING APPARATUS, IMAGE PROCESSING METHOD, PROGRAM, AND DATA CONFIGURATION

(75) Inventor: Osamu Watanabe, Tokyo (JP)

(73) Assignee: Sony Corporation, Tokyo (JP)

(\*) Notice: Subject to any disclaimer, the term of this patent is extended or adjusted under 35 U.S.C. 154(b) by 940 days.

(21) Appl. No.: 11/607,020

(22) Filed: Dec. 1, 2006

(65) Prior Publication Data

US 2007/0127844 A1  Jun. 7, 2007

(30) Foreign Application Priority Data

Dec. 7, 2005  (JP) ................ P2005-353027

(51) Int. Cl.
*G06K 9/00* (2006.01)
*G06K 9/34* (2006.01)
*G06K 9/46* (2006.01)
*G06K 9/64* (2006.01)
*G06K 9/66* (2006.01)
*G06K 9/68* (2006.01)
*G06K 9/20* (2006.01)
*G06K 9/36* (2006.01)
*G06K 9/54* (2006.01)
*G06K 9/60* (2006.01)
*G06T 15/00* (2011.01)
*G09G 5/00* (2006.01)

(52) U.S. Cl. ........ 382/276; 382/103; 382/115; 382/173; 382/191; 382/217; 382/282; 382/285; 382/305; 345/419; 345/646; 345/647

(58) Field of Classification Search ............ 382/100, 382/115–118, 173, 181, 209, 217, 232–233, 382/305; 345/418–420, 619, 646, 648–650
See application file for complete search history.

(56) References Cited

U.S. PATENT DOCUMENTS 5,774,591 A \* 6/1998 Black et al. .............. 382/236
(Continued)

FOREIGN PATENT DOCUMENTS

JP   2000-113217   4/2000
(Continued)

OTHER PUBLICATIONS

Lee et al., "Realistic Modeling for Facial Animation", Computer Graphics Proceedings of SIGGRAPH 1995 pp. 55-62, ACM SIGGRAPH.\*

(Continued)

*Primary Examiner* — Anand Bhatnagar
*Assistant Examiner* — Nathan Bloom
(74) *Attorney, Agent, or Firm* — Finnegan, Henderson, Farabow, Garrett & Dunner, L.L.P.

(57) ABSTRACT

An image processing apparatus comprises a first and a second eyes-and-mouth detecting units, a first and a second skin model generating units, an inside-of-mouth model generating unit, an eyeball model generating unit, a first and a second deformation parameter generating units, and an output unit. The first and second eyes-and-mouth detecting units detect eye boundaries and a mouth boundary from a first and a second face images, respectively. The first and second skin model generating units generate a first and a second skin models, respectively. The inside-of-mouth model generating unit and the eyeball model generating unit generate an inside-of-mouth model and an eyeball model, respectively. The first and second deformation parameter generating units generate a first and a second deformation parameters, respectively. The output unit output the first and second skin models, the first and second deformation parameters, the inside-of-mouth model, and the eyeball model as animation data.

15 Claims, 26 Drawing Sheets

SMILING FACE SKIN MODEL     EXPRESSIONLESS FACE SKIN MODEL

U.S. PATENT DOCUMENTS

| | | | |
|---|---|---|---|
| 5,995,119 A * | 11/1999 | Cosatto et al. | 345/473 |
| 6,532,011 B1 * | 3/2003 | Francini et al. | 345/420 |
| 6,573,899 B2 | 6/2003 | Aono | |
| 6,580,811 B2 * | 6/2003 | Maurer et al. | 382/103 |
| 6,876,364 B2 * | 4/2005 | Buddemeier et al. | 345/473 |
| 7,050,655 B2 * | 5/2006 | Ho et al. | 382/285 |
| 7,127,081 B1 * | 10/2006 | Erdem | 382/103 |
| 7,212,656 B2 * | 5/2007 | Liu et al. | 382/118 |
| 7,454,039 B2 * | 11/2008 | Tu et al. | 382/115 |
| 7,768,528 B1 * | 8/2010 | Edwards et al. | 345/619 |
| 2005/0147280 A1 * | 7/2005 | Yan et al. | 382/118 |
| 2005/0212795 A1 * | 9/2005 | Anderson et al. | 345/419 |
| 2006/0188144 A1 * | 8/2006 | Sasaki et al. | 382/154 |

FOREIGN PATENT DOCUMENTS

| | | |
|---|---|---|
| JP | 2001-175881 | 6/2001 |
| JP | 2002-157605 | 5/2002 |
| JP | 2002-208032 | 7/2002 |
| JP | 2005-242567 | 9/2005 |

OTHER PUBLICATIONS

Pighin et al., "Synthesizing Realistic Facial Expressions from Photographs", Proceedings of SIGGRAPH 98, in Computer Graphics Proceedings, Annual Conference Series, 1998.*

Jun-Yong Noh, "A Survey of Facial Modeling and Animation Techniques".*

Essa and Pentland, "A Vision System for Observing and Extracting Facial Action Parameters", MIT Media Laboratory of Perceptual Computing Section Technical Report No. 247, Apperars in IEEE CVPR 1994 Conference, Seattle, WA, pp. 76-83.*

Deng and Noh, "Computer Facial Animation: A Survey", Chapter 1 of Deng and Neumann's, "Data-Driven 3-D Facial Animation", Springer-Verlag 2008.*

Fasel and Luettin, "Automatic Facial Expression Analysis: A Survey", IDIAP Research Report 99-19, published in: Pattern Recognition, 36(1):256-275, 2003.*

Arai, Kurihara, and Anjyo, "Bilinear Interpolation for Facial Expression and Metamorphosis in Real-Time Animation", The Visual Computer (1996) 12: pp. 105-116, Springer-Verlag.*

Ahlberg and Forchheimer, "Face Tracking for Model-Based Coding and Face Animation", International Journal on Imaging Systems and Technology, vol. 13, Issue 1, pp. 8-22, 2003 Wiley Periodicals.*

Notification of Reasons for Refusal, issued by Japanese Patent Office on Mar. 8, 2011, in a Japanese Application No. 2005-353027, 3 pages.

Yang et al., "A composition method to simulate natural human body motion and facial expression by measuring actual human actions," Institute of Image Information and Television Technical Report [Human Information Network Imaging Media], vol. 22, No. 28, pp. 65-72, HIR98-46, NIM98-68, Jun. 1, 1998, Institute of Image Information and Television Engineers, Japan.

Yamaguchi et al., "Quick master in 30 minutes 3D quick master lecture No. 23," Animation Master Ver8, vol. 24, pp. 92-99, Aug. 1, 2000, CG World, Works Corporation, Japan.

Hirano et al., "Automatic synthesis of 3-D facial expression," Institute of Electronics, Information and Communication Engineers Technical Study Report [Pattern Recognition/Media Understanding], vol. 99, No. 449, pp. 13-20, PRMU99-135, Nov. 19, 1999, Institute of Electronics, Information and Communication Engineers, Japan.

Mukaigawa et al., "Synthesis of facial views with arbitrary poses and expressions using multiple facial images," Information and Communication Engineers Article Magazine, vol. J80-D-II, No. 6, pp. 1555-1562, Jun. 25, 1997, Institute of Electronics, Japan.

* cited by examiner

FIG. 4
EXPRESSIONLESS FACE IMAGE        SMILING FACE IMAGE
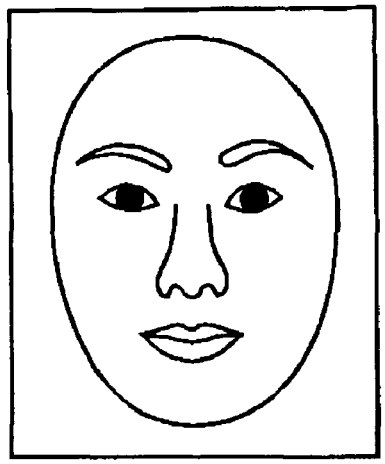 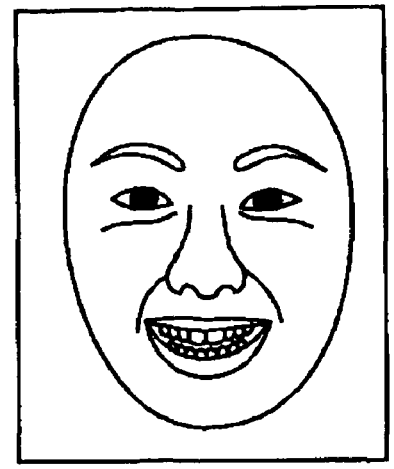
RGB              RGB
$\alpha\,(=1)$         $\alpha\,(=1)$ FIG. 5A 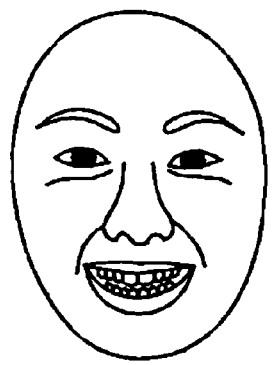 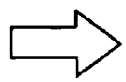
EYE BOUNDARIES
FIG. 5B 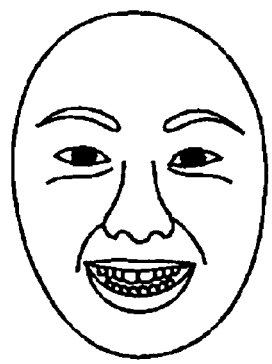 
MOUTH BOUNDARY
FIG. 5C 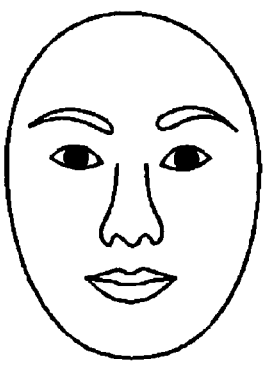 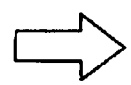
EYE BOUNDARIES
FIG. 5D 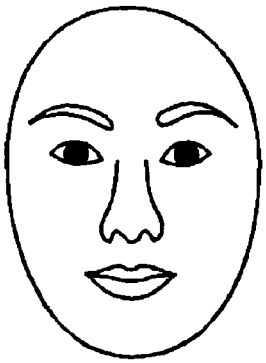 
MOUTH BOUNDARY FIG. 10
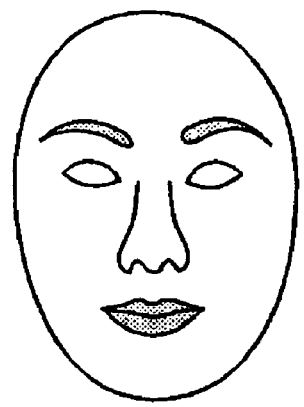
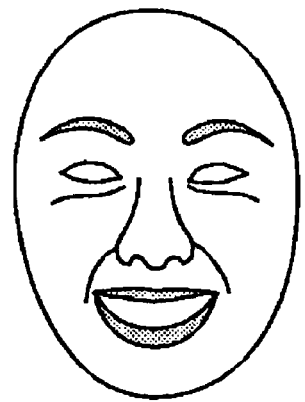
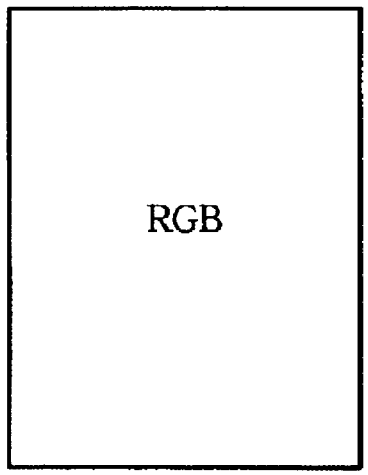
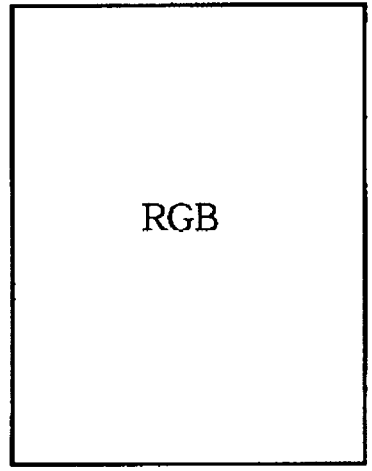
α VALUE    α VALUE
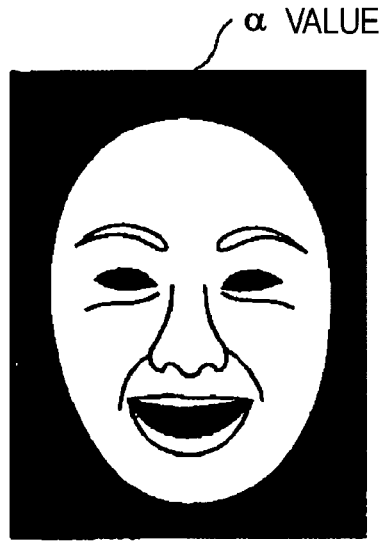

EXPRESSIONLESS FACE SKIN MODEL

SMILING FACE SKIN MODEL

IMAGE PROCESSING APPARATUS, IMAGE PROCESSING METHOD, PROGRAM, AND DATA CONFIGURATION

CROSS REFERENCES TO RELATED APPLICATIONS

The present invention contains subject matter related to Japanese Patent Application JP 2005-353027 filed in the Japanese Patent Office on Dec. 7, 2005, the entire contents of which are incorporated herein by reference.

BACKGROUND OF THE INVENTION

1. Field of the Invention

The present invention relates to an image processing apparatus, an image processing method, a program, and a data configuration. More specifically, the present invention relates to an image processing apparatus, an image processing method, a program, and a data configuration capable of generating natural face images.

2. Description of the Related Art

A technique of generating a face image of a different expression on the basis of a face image is called morphing (e.g., Patent Document 1: Japanese Unexamined Patent Application Publication No. 2001-175881).

The morphing is a technique of generating images to complement an intermediate process (hereinafter referred to as intermediate images as necessary) in order to express a gradual change from an image P1 to another image P2 by animation (moving images). The intermediate images are generated by variations of shapes of the images P1 and P2 and blending of the images P1 and P2 (blending of pixel values).

In the morphing, for example, animation smoothly changing from an expressionless face to a smiling face can be realized by using an expressionless face image and a smiling face image of the same person.

Also, in the morphing, animation smoothly changing from a human to an animal, animation smoothly changing from a child to an adult, and animation smoothly changing from a person to another person can be realized.

SUMMARY OF THE INVENTION

In the morphing, control points are set on the image P1 and control points corresponding to the control points on the image P1 are set on the image P2. An intermediate image is generated by smoothly moving the control points on the image P1 to the positions of the corresponding control points on the image P2.

If there is a portion that does not exist in the image P1 but that exists in the image P2, intermediate images in which the portion gradually appears are generated. As a result, for example, when animation of changing an expression of a face of the same person is realized by morphing, an unnatural intermediate image having a part that should not change changes may be generated.

Specifically, assume that the image P1 is an expressionless face image of a person who is looking ahead with his/her mouth closed, and that the image P2 is a smiling face image of the person who is smiling with his/her mouth opened. In that case, the smiling face image includes teeth although the expressionless face image does not include them. For this reason, unnatural intermediate images in which the teeth gradually become large and white may be generated. Furthermore, since the size of exposed black eyes is different between the expressionless face image and the smiling face image, unnatural intermediate images in which the shape of the black eyes changes may be generated.

The present invention has been made in view of these circumstances and is directed to generating natural face images.

According to an embodiment of the present invention, there is provided an image processing apparatus generating animation data to generate a face image of a different expression on the basis of a face image. The image processing apparatus includes a first eyes-and-mouth detecting unit configured to detect eye boundaries where eyeballs are exposed and a mouth boundary between lips and the inside of a mouth from a first face image, which is a face image of a first expression; a second eyes-and-mouth detecting unit configured to detect eye boundaries and a mouth boundary from a second face image, which is a face image of a second expression different from the first expression; a first skin model generating unit configured to generate a first skin model, which is a face model generated by removing the inside of the eye boundaries and the inside of the mouth boundary from the first face image; a second skin model generating unit configured to generate a second skin model, which is a face model generated by removing the inside of the eye boundaries and the inside of the mouth boundary from the second face image; an inside-of-mouth model generating unit configured to generate an inside-of-mouth model, which is a model of the inside of the mouth boundary; an eyeball model generating unit configured to generate an eyeball model, which is a model of eyeballs; a first deformation parameter generating unit configured to generate a first deformation parameter used to deform the first skin model to the second skin model; a second deformation parameter generating unit configured to generate a second deformation parameter used to deform the second skin model to the first skin model; and an output unit configured to output the first and second skin models, the first and second deformation parameters, the inside-of-mouth model, and the eyeball model as the animation data.

According to the embodiment of the present invention, there is provided an image processing method for generating animation data to generate a face image of a different expression on the basis of a face image, or a program allowing a computer to execute image processing of generating animation data to generate a face image of a different expression on the basis of a face image. The method or the program includes the steps of detecting eye boundaries where eyeballs are exposed and a mouth boundary between lips and the inside of a mouth from a first face image, which is a face image of a first expression; detecting eye boundaries and a mouth boundary from a second face image, which is a face image of a second expression different from the first expression; generating a first skin. model, which is a face model generated by removing the inside of the eye boundaries and the inside of the mouth boundary from the first face image; generating a second skin model, which is a face model generated by removing the inside of the eye boundaries and the inside of the mouth boundary from the second face image; generating an inside-of-mouth model, which is a model of the inside of the mouth boundary; generating an eyeball model, which is a model of eyeballs; generating a first deformation parameter used to deform the first skin model to the second skin model; generating a second deformation parameter used to deform the second skin model to the first skin model; and outputting the first and second skin models, the first and second deformation parameters, the inside-of-mouth model, and the eyeball model as the animation data.

In the above-described image processing apparatus, image processing method, or program, eye boundaries where eyeballs are exposed and a mouth boundary between lips and the inside of a mouth are detected from a first face image, which is a face image of a first expression; eye boundaries and a mouth boundary are detected from a second face image, which is a face image of a second expression different from the first expression; a first skin model, which is a face model generated by removing the inside of the eye boundaries and the inside of the mouth boundary from the first face image, is generated; a second skin model, which is a face model generated by removing the inside of the eye boundaries and the inside of the mouth boundary from the second face image, is generated; an inside-of-mouth model, which is a model of the inside of the mouth boundary, is generated; an eyeball model, which is a model of eyeballs, is generated; a first deformation parameter used to deform the first skin model to the second skin model is generated; a second deformation parameter used to deform the second skin model to the first skin model is generated; and the first and second skin models, the first and second deformation parameters, the inside-of-mouth model, and the eyeball model are output as the animation data.

According to another embodiment of the present invention, there is provided an image processing apparatus to generate a face image. The image processing apparatus includes a data obtaining unit configured to obtain animation data including a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model; a deformation level setting unit configured to set a deformation level indicating a level of deformation from one of the first and second expressions to the other; a first skin model deforming unit configured to deform the first skin model to a first deformed skin model in accordance with the deformation level by using the first deformation parameter; a second skin model deforming unit configured to deform the second skin model to a second deformed skin model in accordance with the deformation level by using the second deformation parameter; a blending parameter setting unit configured to set a blending parameter indicating a level of blending the first and second deformed skin models in accordance with the deformation level; a skin model blending unit configured to blend the first and second deformed skin models in accordance with the blending parameter so as to generate a blended skin model; and a face image generating unit configured to generate a face image of an expression according to the deformation level by blending the blended skin model, the inside-of-mouth model, and the eyeball model.

According to the other embodiment of the present invention, there is provided an image processing method for generating a face image or a program allowing a computer to execute image processing of generating a face image. The method or the program includes the steps of obtaining animation data including a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model; setting a deformation level indicating a level of deformation from one of the first and second expressions to the other; deforming the first skin model to a first deformed skin model in accordance with the deformation level by using the first deformation parameter; deforming the second skin model to a second deformed skin model in accordance with the deformation level by using the second deformation parameter; setting a blending parameter indicating a level of blending the first and second deformed skin models in accordance with the deformation level; blending the first and second deformed skin models in accordance with the blending parameter so as to generate a blended skin model; and generating a face image of an expression according to the deformation level by blending the blended skin model, the inside-of-mouth model, and the eyeball model.

In the above-described image processing apparatus, image processing method, or program, animation data is obtained. The animation data includes a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model. A deformation level indicating a level of deformation from one of the first and second expressions to the other is set. The first skin model is deformed to a first deformed skin model in accordance with the deformation level by using the first deformation parameter. The second skin model is deformed to a second deformed skin model in accordance with the deformation level by using the second deformation parameter. A blending parameter indicating a level of blending the first and second deformed skin models is set in accordance with the deformation level. The first and second deformed skin models are blended into a blended skin model in accordance with the blending parameter. A face image of an expression according to the deformation level is generated by blending the blended skin model, the inside-of-mouth model, and the eyeball model.

According to another embodiment of the present invention, there is provided a data configuration of animation data to generate a face image. The data configuration includes a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model.

In the above-described data configuration, animation data includes the first and second skin models; the first and second deformation parameters; the inside-of-mouth model; and the eyeball model.

According to the embodiments of the present invention, natural face images can be generated.

BRIEF DESCRIPTION OF THE DRAWINGS

FIG. 4 shows an example of image data of an expressionless face image and a smiling face image stored in an image data storing unit 121;

FIGS. 5A to 5D illustrate a process performed by eyes-and-mouth detecting units 131A and 131B;

FIG. 10 illustrates a process performed by skin model generating units 132A and 132B;

DESCRIPTION OF THE PREFERRED EMBODIMENTS

Figure 1:
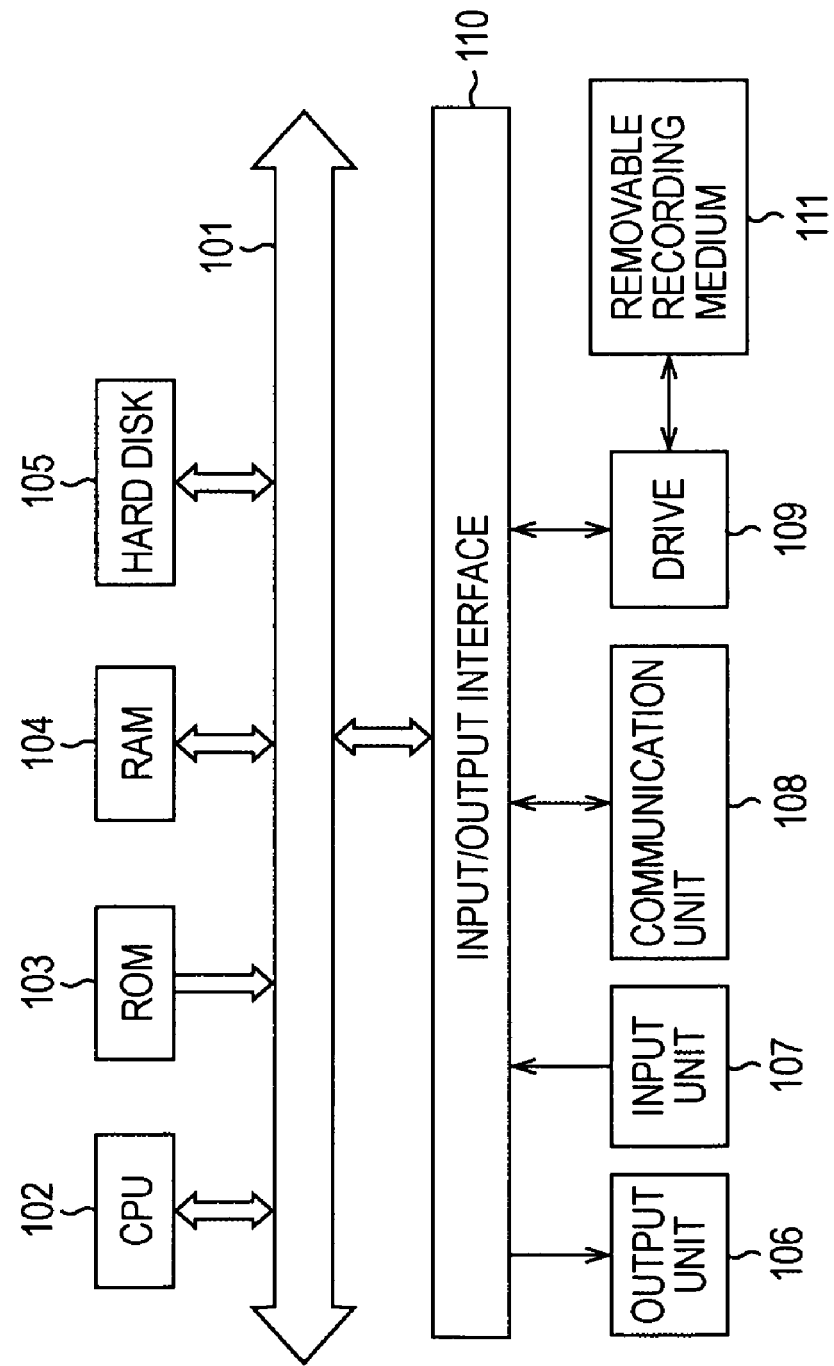
FIG. 1 is a block diagram showing an example of a hardware configuration of a computer functioning as an image processing system according to an embodiment of the present invention.

Before describing an embodiment of the present invention, the correspondence between the features of the claims and the specific elements disclosed in an embodiment of the present invention or the drawings is discussed below. This description is intended to assure that an embodiment supporting the claimed invention is described in this specification or the drawings. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus according to an embodiment of the present invention is an image processing apparatus (e.g., the animation data generating apparatus shown in FIG. 2) generating animation data to generate a face image of a different expression on the basis of a face image. The image processing apparatus includes a first eyes-and-mouth detecting unit (e.g., the eyes-and-mouth detecting unit 131A shown in FIG. 3) configured to detect eye boundaries where eyeballs are exposed and a mouth boundary between lips and the inside of a mouth from a first face image, which is a face image of a first expression; a second eyes-and-mouth detecting unit (e.g., the eyes-and-mouth detecting unit 131B shown in FIG. 3) configured to detect eye boundaries and a mouth boundary from a second face image, which is a face image of a second expression different from the first expression; a first skin model generating unit (e.g., the skin model generating unit 132A shown in FIG. 3) configured to generate a first skin model, which is a face model generated by removing the inside of the eye boundaries and the inside of the mouth boundary from the first face image; a second skin model generating unit (e.g., the skin model generating unit 132B shown in FIG. 3) configured to generate a second skin model, which is a face model generated by removing the inside of the eye boundaries and the inside of the mouth boundary from the second face image; an inside-of-mouth model generating unit (e.g., the inside-of-mouth model generating unit 134 shown in FIG. 3) configured to generate an inside-of-mouth model, which is a model of the inside of the mouth boundary; an eyeball model generating unit (e.g., the eyeball model generating unit 136 shown in FIG. 3) configured to generate an eyeball model, which is a model of eyeballs; a first deformation parameter generating unit (e.g., the deformation parameter generating unit 133A shown in FIG. 3) configured to generate a first deformation parameter used to deform the first skin model to the second skin model; a second deformation parameter generating unit (e.g., the deformation parameter generating unit 133B shown in FIG. 3) configured to generate a second deformation parameter used to deform the second skin model to the first skin model; and an output unit (e.g., the output control unit 137 shown in FIG. 3) configured to output the first and second skin models, the first and second deformation parameters, the inside-of-mouth model, and the eyeball model as the animation data.

The image processing apparatus according to the embodiment of the present invention may further include a deformation level setting unit (e.g., the deformation level setting unit 151 shown in FIG. 19) configured to set a deformation level indicating a level of deformation from one of the first and second expressions to the other; a first skin model deforming unit (e.g., the skin model deforming unit 152A shown in FIG. 19) configured to deform the first skin model to a first deformed skin model in accordance with the deformation level by using the first deformation parameter; a second skin model deforming unit (e.g., the skin model deforming unit 152B shown in FIG. 19) configured to deform the second skin model to a second deformed skin model in accordance with the deformation level by using the second deformation parameter; a blending parameter setting unit (e.g., the blending parameter setting unit 153 shown in FIG. 19) configured to set a blending parameter indicating a level of blending the first and second deformed skin models in accordance with the deformation level; a skin model blending unit (e.g., the skin model blending unit 154 shown in FIG. 19) configured to blend the first and second deformed skin models in accordance with the blending parameter so as to generate a blended skin model; and a face image generating unit (e.g., the face image generating unit 155 shown in FIG. 19) configured to generate a face image of an expression according to the deformation level by blending the blended skin model, the inside-of-mouth model, and the eyeball model.

An image processing method or a program according to the embodiment of the present invention is an image processing method for generating animation data to generate a face image of a different expression on the basis of a face image or a program allowing a computer to execute image processing of generating animation data to generate a face image of a different expression on the basis of a face image. The image processing method or the program includes the steps of detecting eye boundaries where eyeballs are exposed and a mouth boundary between lips and the inside of a mouth from a first face image, which is a face image of a first expression (e.g., step $S11_1$ shown in FIG. 18); detecting eye boundaries and a mouth boundary from a second face image, which is a face image of a second expression different from the first expression (e.g., step $S11_2$ shown in FIG. 18); generating a first skin model, which is a face model generated by removing the inside of the eye boundaries and the inside of the mouth boundary from the first face image (e.g., step $S12_1$ shown in FIG. 18); generating a second skin model, which is a face model generated by removing the inside of the eye boundaries and the inside of the mouth boundary from the second face image (e.g., step $S12_2$ shown in FIG. 18); generating an inside-of-mouth model, which is a model of the inside of the mouth boundary (e.g., step $S13_1$ shown in FIG. 18); generating an eyeball model, which is a model of eyeballs (e.g., step $S13_3$ shown in FIG. 18); generating a first deformation parameter used to deform the first skin model to the second skin model (e.g., step $S14_1$ shown in FIG. 18); generating a second deformation parameter used to deform the second skin model to the first skin model (e.g., step $S14_2$ shown in FIG. 18); and outputting the first and second skin models, the first and second deformation parameters, the inside-of-mouth model, and the eyeball model as the animation data (e.g., step S15 shown in FIG. 18).

An image processing apparatus according to another embodiment of the present invention is an image processing apparatus (e.g., the image generating apparatus shown in FIG. 2) to generate a face image. The image processing apparatus includes a data obtaining unit (e.g., the data obtaining unit 150 shown in FIG. 19) configured to obtain animation data including a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model; a deformation level setting unit (e.g., the deformation level setting unit 151 shown in FIG. 19) configured to set a deformation level indicating a level of deformation from one of the first and second expressions to the other; a first skin model deforming unit (e.g., the skin model deforming unit 152A shown in FIG. 19) configured to deform the first skin model to a first deformed skin model in accordance with the deformation level by using the first deformation parameter; a second skin model deforming unit (e.g., the skin model deforming unit 152B shown in FIG. 19) configured to deform the second skin model to a second deformed skin model in accordance with the deformation level by using the second deformation parameter; a blending parameter setting unit (e.g., the blending parameter setting unit 153 shown in FIG. 19) configured to set a blending parameter indicating a level of blending the first and second deformed skin models in accordance with the deformation level; a skin model blending unit (e.g., the skin model blending unit 154 shown in FIG. 19) configured to blend the first and second deformed skin models in accordance with the blending parameter so as to generate a blended skin model; and a face image generating unit (e.g., the face image generating unit 155 shown in FIG. 19) configured to generate a face image of an expression according to the deformation level by blending the blended skin model, the inside-of-mouth model, and the eyeball model.

An image processing method or a program according to the other embodiment of the present invention is an image processing method for generating a face image or a program allowing a computer to execute image processing of generating a face image. The image processing method or the program includes the steps of obtaining animation data including a first skin model, which is a face model generated by removing the inside of eye boundaries where eyeballs are exposed and the inside of a mouth boundary between lips and the inside of a mouth from a first face image, which is a face image of a first expression; a second skin model, which is a face model generated by removing the. inside of eye boundaries and the inside of a mouth boundary from a second face image, which is a face image of a second expression different from the first expression; an inside-of-mouth model, which is a model of the inside of the mouth boundary; an eyeball model, which is a model of eyeballs; a first deformation parameter used to deform the first skin model to the second skin model; and a second deformation parameter used to deform the second skin model to the first skin model (e.g., step S30 shown in FIG. 20); setting a deformation level indicating a level of deformation from one of the first and second expressions to the other (e.g., step S31 shown in FIG. 20); deforming the first skin model to a first deformed skin model in accordance with the deformation level by using the first deformation parameter (e.g., step $S33_1$ shown in FIG. 20); deforming the second skin model to a second deformed skin model in accordance with the deformation level by using the second deformation parameter (e.g., step $S33_2$ shown in FIG. 20); setting a blending parameter indicating a level of blending the first and second deformed skin models in accordance with the deformation level (e.g., step S32 shown in FIG. 20); blending the first and second deformed skin models in accordance with the blending parameter so as to generate a blended skin model (e.g., step S34 shown in FIG. 20); and generating a face image of an expression according to the deformation level by blending the blended skin model, the inside-of-mouth model, and the eyeball model (e.g., step S35 shown in FIG. 20).

Hereinafter, an embodiment of the present invention is described with reference to the drawings.

FIG. 1 shows an example of a hardware configuration of a computer realizing an image processing system according to an embodiment of the present invention.

The computer includes a CPU (central processing unit) 102. The CPU 102 connects to an input/output interface 110 via a bus 101. Upon receiving a command from a user via the input/output interface 110, the command being input through an. operation on an input unit 107 including a keyboard, a mouse, and a microphone, the CPU 102 executes a program stored in a ROM (read only memory) 103 in response to the command. Also, the CPU 102 executes a program stored in a hard disk 105; a program transferred from a satellite or a network, received by a communication unit 108, and installed in the hard disk 105; or a program read from a removable recording medium 111 loaded on a drive 109 and installed in the hard disk 105, by loading the program into a RAM (random access memory) 104. Accordingly, the CPU 102 executes a process in accordance with a flowchart described below or a process performed by a configuration shown in a block diagram described below. Then, the CPU 102 allows an output unit 106 including an LCD (liquid crystal display) and a speaker to output a processing result, allows the communication unit 108 to transmit the processing result, or allows the hard disk 105 to record the processing result, via the input/output interface 110 as necessary.

The program to be executed by the CPU 102 can be recorded on the hard disk 105 or the ROM 103, serving as a recording medium incorporated in the computer, in advance.

Alternatively, the program can be stored (recorded) temporarily or permanently on the removable recording medium 111, such as a flexible disk, a CD-ROM (compact disc read only memory), a MO (magneto-optical) disc, a DVD (digital versatile disc), a magnetic disk, or a semiconductor memory. The removable recording medium 111 can be provided as a so-called package software.

The program can be installed from the above-described removable recording medium 111 to the computer, wirelessly transferred from a download site via an artificial satellite for digital satellite broadcasting to the computer, or transferred in a wired manner through a network, such as a LAN (local area network) or the Internet, to the computer. The computer can receive the program transferred in that way by the communication unit 108, serving as an interface compatible with NIC (network interface card), IEEE (Institute of Electrical and Electronics Engineers) 1394, or USB (universal serial bus), and can install the program in the hard disk 105 incorporated therein.

In the example shown in FIG. 1, the computer (CPU 102) executes an (application) program installed in the hard disk 105 so as to function as an image processing system to perform a process of generating animation data used to generate a face image of a different expression on the basis of a face image (animation data generating process) and a process of generating a face image by using the animation data (face image generating process).

Figure 2:
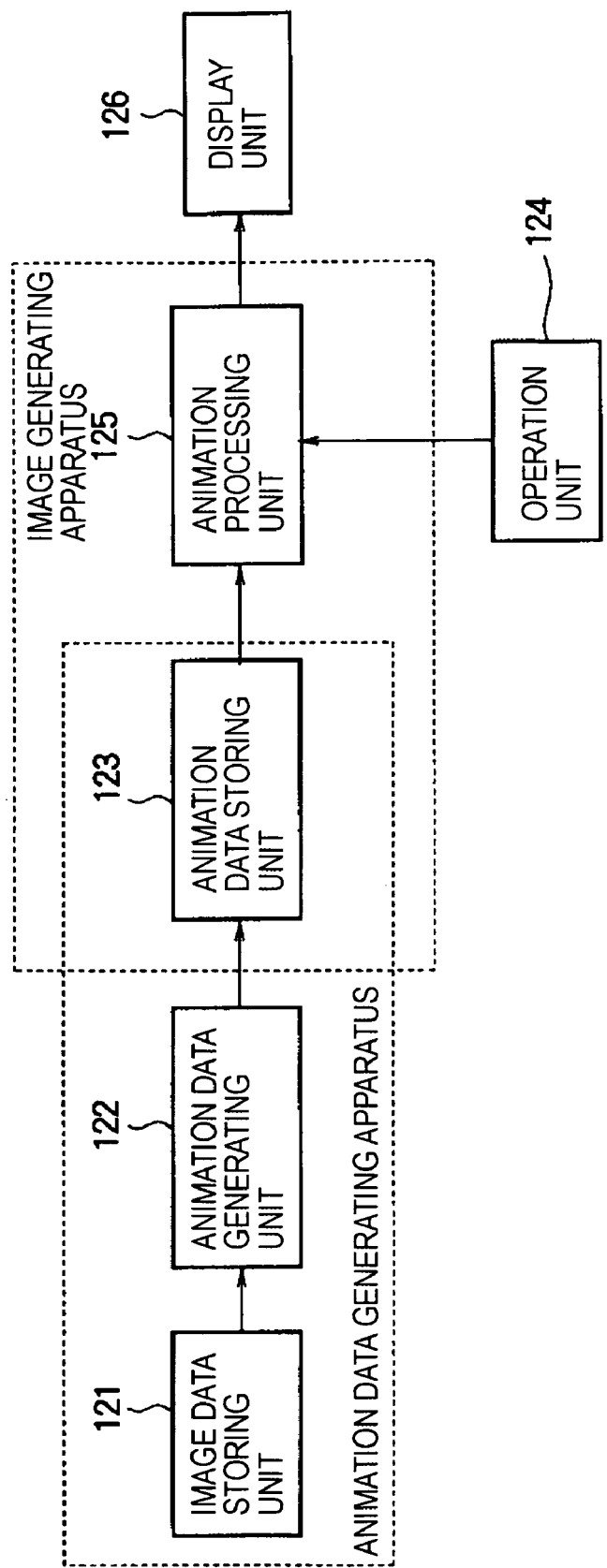
FIG. 2 is a block diagram showing an example of a configuration of the image processing system according to the embodiment of the present invention.

FIG. 2 shows an example of a configuration of the image processing system that is equivalently realized when the computer shown in FIG. 1 executes the program.

Image data of human face images is supplied-to an image data storing unit 121. The image data storing unit 121 corresponds to, for example, the RAM 104, the hard disk 105, or the removable recording medium 111 shown in FIG. 1, and temporarily stores image data of a plurality of (e.g., two) face images supplied thereto.

The face images to be stored in the image data storing unit 121 include images captured by a digital (still) camera and images obtained by scanning photos by a scanner. Those images can be obtained via the communication unit 108.

Herein, the two face images stored in the image data storing unit 121 are face images of different expressions of the same person. More specifically, one of the two face images stored in the image data storing unit 121 (first face image) is a face image of a smiling expression (first expression) (hereinafter referred to as a smiling face image as necessary), and the other (second face image) is a face image of a different expression, e.g., expressionless (second expression) (hereinafter referred to as an expressionless face image as necessary).

Note that the two face images stored in the image data storing unit 121 are not limited to a combination of a smiling face image and an expressionless face image. For example, a combination of a smiling face image and an angry face image; a combination of an expressionless face image and a crying face image; and a combination of an arbitrary expression (first expression) face image and another expression (second expression) face image, can be adopted as the combination of two face images stored in the image data storing unit 121.

In the two face images: a smiling face image and an expressionless face image stored in the image data storing unit 121, the brightness, color, and size are already normalized so that the description can be simplified. An arbitrary method can be adopted as a method for normalizing the brightness, color, and size.

An animation data generating unit 122 reads the image data of the smiling face image and the expressionless face image stored in the image data storing unit 121. Then, the animation data generating unit 122 generates animation data to generate (used to generate) an intermediate image of an expression other than expressionless or smiling to complement a process of change from the expressionless face image to the smiling face image (or smiling face image to expressionless face image) by using the image data, and supplies the generated animation data to an animation data storing unit 123.

The animation data storing unit 123 stores the animation data supplied from the animation data generating unit 122.

The animation data storing unit 123 corresponds to the RAM 104, the hard disk 105, or the removable recording medium 111 shown in FIG. 1.

After being stored in the RAM 104, the hard disk 105, or the removable recording medium 111 shown in FIG. 1 serving as the animation data storing unit 123, the animation data can.be further processed by the computer shown in FIG. 1. Alternatively, the animation data can be transferred to another computer from the communication unit 108 through a network such as the Internet and can be processed in the computer.

An operation unit 124 is operated by a user and supplies an operation signal corresponding to the operation to an animation processing unit 125. The operation unit 124 corresponds to the input unit 107 shown in FIG. 1.

The animation processing unit 125 obtains the animation data stored in the animation data storing unit 123 by reading it, generates (image data of) a face image according to an operation signal from the operation unit 124 by using the animation data, and supplies the image data to a display unit 126. The animation processing unit 125 can obtain animation data transferred from another computer by receiving it via the communication unit 108.

The display unit 126 includes a CRT (cathode ray tube) or an LCD and displays face images supplied from the animation processing unit 125. The display unit 126 corresponds to the output unit 106 shown in FIG. 1.

In the image processing system having the above-described configuration, the animation data generating unit 122 reads image data of a smiling face image and an expressionless face image stored in the image data storing unit 121, generates animation data by using the image data, and supplies the animation data to the animation data storing unit 123 so as to be stored therein. Then, the animation processing unit 125 generates a face image according to an operation signal from the operation unit 124 by using the animation data stored in the animation data storing unit 123 and supplies the face image to the display unit 126, which displays the face image.

In FIG. 2, the image data storing unit 121, the animation data generating unit 122, and the animation data storing unit 123 constitute an animation data generating apparatus to generate animation data by using image data of a smiling face image and an expressionless face image. On the other hand, the animation data storing unit 123 and the animation processing unit 125 constitute an image generating apparatus to generate image data of face images by using the animation data. In FIG. 2, the animation data generating apparatus and the image generating apparatus are combined into the image processing system. However, the animation data generating apparatus and the image generating apparatus may be configured as independent apparatuses.

Figure 3:
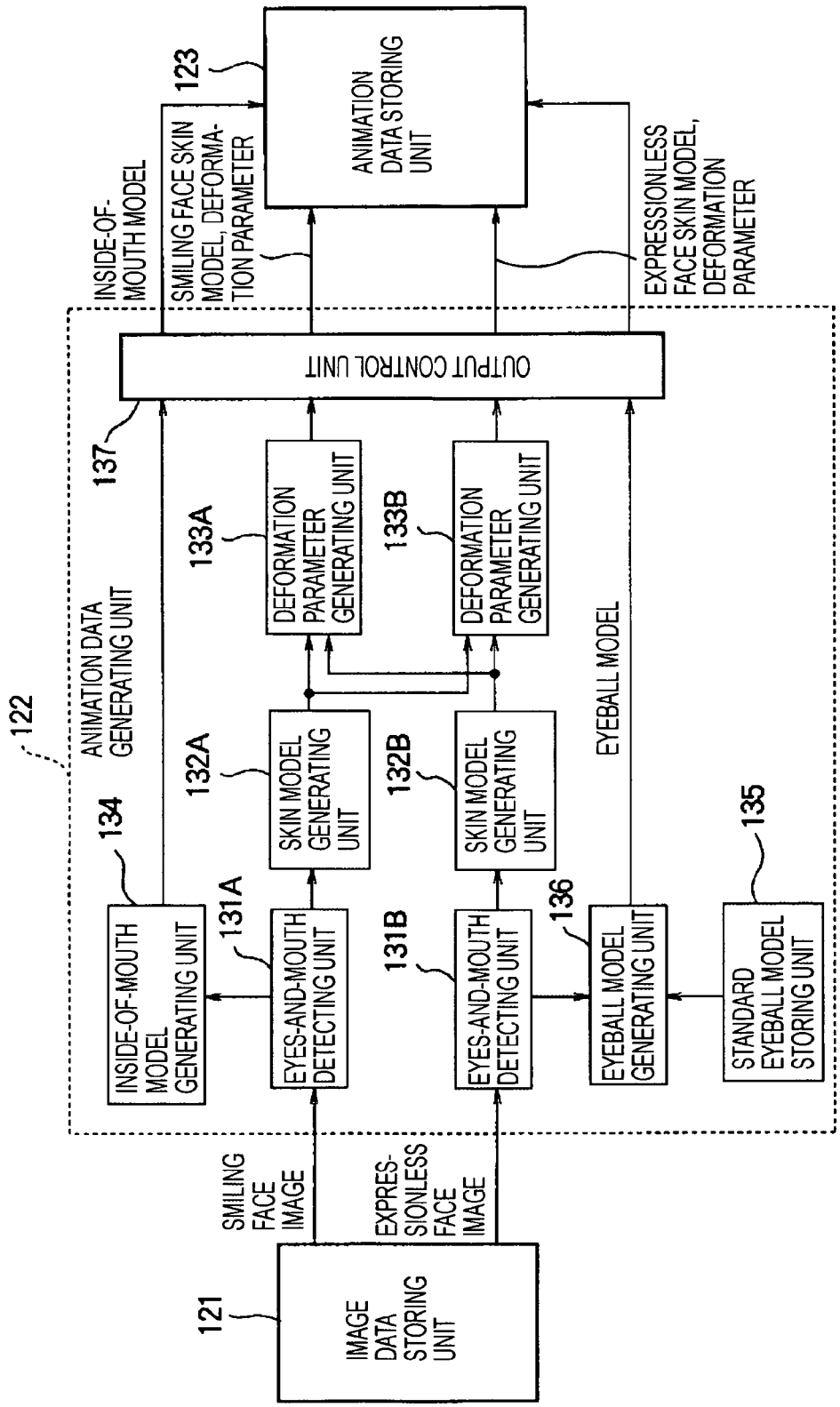
FIG. 3 is a block diagram showing an example of a configuration of an animation data generating unit 122.

FIG. 3 shows an example of a configuration of the animation data generating unit 122 shown in FIG. 2.

An eyes-and-mouth detecting unit 131A detects, from the smiling face image stored in the image data storing unit 121, eye boundaries where eyeballs are exposed and a mouth boundary between lips and the inside of a mouth, and supplies the eye boundaries and the mouth boundary together with the smiling face image to a skin model generating unit 132A and an inside-of-mouth model generating unit 134.

An eyes-and-mouth detecting unit 131B detects eye boundaries and a mouth boundary from the expressionless face image stored in the image data storing unit 121, and supplies the eye boundaries and the mouth boundary together with the expressionless face image to a skin model generating unit 132B and an eyeball model generating unit 136.

The skin model generating unit 132A removes the inside of the eye boundaries and the mouth boundary supplied from the eyes-and-mouth detecting unit 131A from the smiling face image supplied from the eyes-and-mouth detecting unit 131A, so as to generate a smiling face skin model (first skin model), which is a two-dimensional model (image) of a face without the inside of the eye boundaries and the mouth boundary. Then, the skin model generating unit 132A supplies the first skin model to deformation parameter generating units 133A and 133B.

That is, the skin model generating unit 132A separates parts of the face at the back of skin, that is, eyeballs and the inside of the mouth (teeth, gums, and tongue), from the smiling face image in order to limit the object to be deformed to the surface of the face (skin). Accordingly, the skin model generating unit 132A generates a smiling face skin model, which is a model of a face from which the inside of the eye boundaries and the inside of the mouth boundary are removed, and supplies the smiling face skin model to the deformation parameter generating units 133A and 133B.

As the skin model generating unit 132A, the skin model generating unit 132B removes the inside of the eye boundaries and the mouth boundary supplied from the eyes-and-mouth detecting unit 131B from the expressionless face image supplied from the eyes-and-mouth detecting unit 131B, so as to generate an expressionless face skin model (second skin model), which is a two-dimensional model of a face without the inside of the eye boundaries and the mouth boundary. Then, the skin model generating unit 132B supplies the second skin model to the deformation parameter generating units 133A and 133B.

The deformation parameter generating unit 133A generates a smiling face deformation parameter (first deformation parameter) to deform the smiling face skin model to the expressionless face skin model by using the smiling face skin model supplied from the skin model generating unit 132A and the expressionless face skin model supplied from the skin model generating unit 132B, and supplies the first deformation parameter together with the smiling face skin model to an output control unit 137.

The deformation parameter generating unit 133B generates an expressionless face deformation parameter (second deformation parameter) to deform the expressionless face skin model to the smiling face skin model by using the smiling face skin model supplied from the skin model generating unit 132A and the expressionless face skin model supplied from the skin model generating unit 132B, and supplies the second deformation parameter together with the expressionless face skin model to the output control unit 137.

The inside-of-mouth model generating unit 134 generates an inside-of-mouth model, which is a two-dimensional model of the inside of the mouth boundary of the smiling face image (and the expressionless face image) by using the smiling face image and the mouth boundary from the eyes-and-mouth detecting unit 131A, and supplies the inside-of-mouth model to the output control unit 137. That is, the inside-of-mouth model generating unit 134 generates an inside-of-mouth model by extracting the inside of the mouth boundary of the smiling face image as an inside-of-mouth model and supplies the inside-of-mouth model to the output control unit 137.

A standard eyeball model storing unit 135 stores a standard eyeball model, which is a standard model (image) of eyeballs.

The eyeball model generating unit 136 generates an eyeball model, which is a two-dimensional model of eyeballs of the expressionless face image (and the smiling face image), by using the expressionless face image and the eye boundaries from the eyes-and-mouth detecting unit 131B, and supplies the eyeball model to the output control unit 137.

That is, the eyeball model generating unit 136 generates an eyeball model by adapting the standard eyeball model stored in the standard eyeball model storing unit 135 to the expressionless face image. More specifically, the eyeball model generating unit 136 recognizes black eyes in the right and left eyeballs of the expressionless face image from the expressionless face image and the eye boundaries supplied from the eyes-and-mouth detecting unit 131B, and adjusts (deforms) the standard eyeball model so as to match with the distance between the black eyes in the right and left eyeballs and the size of the black eyes. Furthermore, the eyeball model generating unit 136 replaces the black eyes of the standard eyeball model after deformation with the black eyes recognized in the expressionless face image, and supplies the standard eyeball model after replacement of the black eyes to the output control unit 137 as an eyeball model of the expressionless face image.

Herein, if the size of the face is different (is not normalized) in the smiling face image and the expressionless face image stored in the image data storing unit 121, the smiling face image is scaled up/down on the basis of the black eyes recognized by the eyeball model generating unit 136, so that the size of the face in the smiling face image can be matched with that in the expressionless face image.

The output control unit 137 outputs animation data: the smiling face skin model and the smiling face deformation parameter from the deformation parameter generating unit 133A; the expressionless face skin model and the expressionless face deformation parameter from the deformation parameter generating unit 133B; the inside-of-mouth model from the inside-of-mouth model generating unit 134; and the eyeball model from the eyeball model generating unit 136. The animation data is stored in the animation data storing unit 123.

FIG. 4 shows an example of image data of the expressionless face image and the smiling face image stored in the image data storing unit 121.

The image data of the expressionless face image (left side in FIG. 4) and the image data of the smiling face image (right side in FIG. 4) are data of a so-called RGBα format, and has each value (RGB value) of R (red), G (green), and B (blue) and an α value as a pixel value. The α value is a parameter used to blend an image with another image and has a real value from 0 to 1. For example, assume that the RGB value of the expressionless face image or the smiling face image is represented by $VAL1_{RBG}$ and that the RGB value of another image to be blended with the expressionless face image or the smiling face image is represented by $VAL2_{RBG}$. In that case, an RGB value $VAL_{RBG}$ as a blend result is expressed by the following expression:

$$VAL_{RBG} = \alpha \times VAL1_{RBG} + (1-\alpha) \times VAL2_{RBG}.$$

Note that, the α values of the expressionless face image and the smiling face image are 1 in a stage of being stored in the image data storing unit 121.

Next, the process performed by the eyes-and-mouth detecting units 131A and 131B is further described with reference to FIGS. 5A to 5D.

FIGS. 5A and 5B schematically show the smiling face image stored in the image data storing unit 121 (FIG. 3), whereas FIGS. 5C and 5D schematically show the expressionless face image stored in the image data storing unit 121.

The smiling face images shown in FIGS. 5A and 5B are fullface smiling face images with an opened mouth and narrowed eyes. The expressionless face images shown in FIGS. 5C and 5D are fullface expressionless face images with a closed mouth.

The eyes-and-mouth detecting unit 131A detects eye boundaries (boundaries between eyeballs and eyelids) where eyeballs are exposed from the smiling face image, as shown in FIG. 5A, and also detects a mouth boundary between lips and the inside of the mouth (a boundary defined by the lower side of the upper lip and the upper side of the lower lip), as shown in FIG. 5B.

Likewise, the eyes-and-mouth detecting unit 131B detects eye boundaries (boundaries between eyeballs and eyelids) where eyeballs are exposed from the expressionless face image, as shown in FIG. 5C, and also detects a mouth boundary between lips and the inside of the mouth (a boundary defined by the lower side of the upper lip and the upper side of the lower lip), as shown in FIG. 5D.

Since the smiling face image is an image of a face in which the eyes are narrowed, the area defined by the eye boundaries detected from the smiling face image (FIG. 5A) is smaller than that detected from the expressionless face image (FIG. 5C).

Also, since the smiling face image is an image of a face in which the mouth is open, the mouth boundary defining the opened portion is detected as shown in FIG. 5B. On the other hand, the expressionless face image is an image of a face in which the mouth is closed. Thus, the lower side of the upper lip matches with the upper side of the lower lip, so that the linear mouth boundary is detected as shown in FIG. 5D.

FIGS. 6 to 9 show eye boundaries and mouth boundaries detected from actual images.

Figure 6:
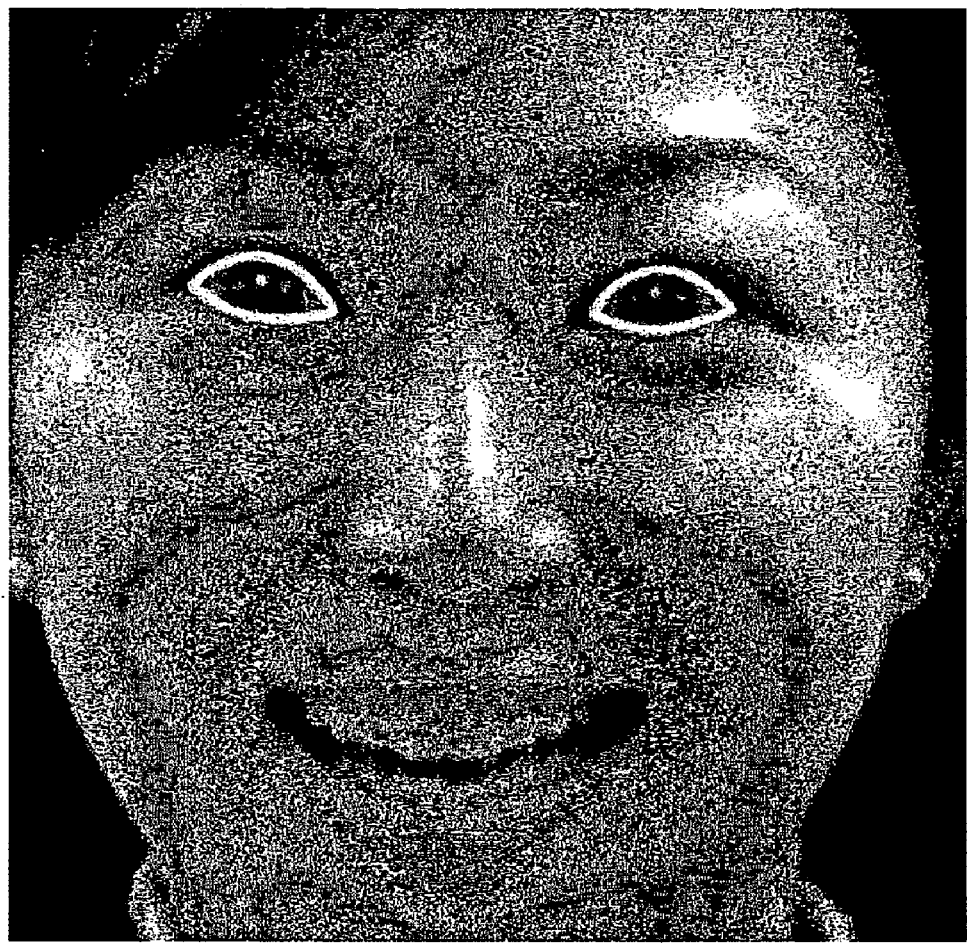
FIG. 6 shows eye boundaries detected from an actual image.
Figure 7:
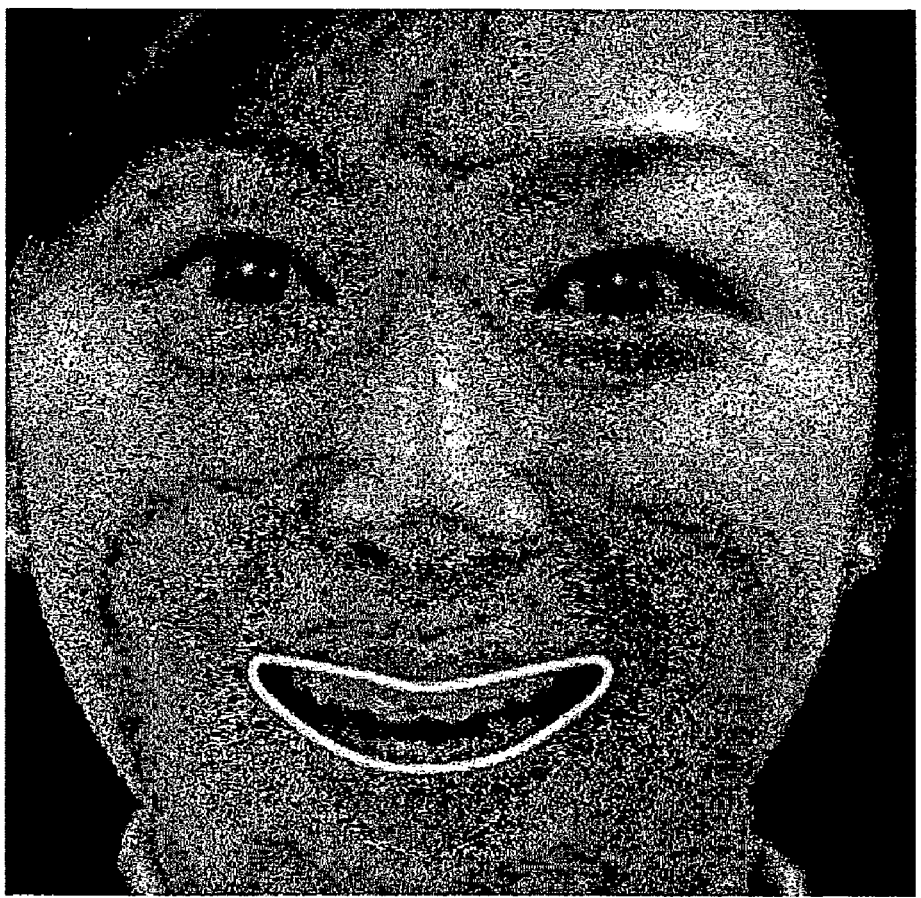
FIG. 7 shows a mouth boundary detected from the actual image.
Figure 8:
FIG. 8 shows eye boundaries detected from an actual image.
Figure 9:
FIG. 9 shows a mouth boundary detected from the actual image.

FIG. 6 shows eye boundaries detected from an actual smiling face image. FIG. 7 shows a mouth boundary detected from the actual smiling face image. FIG. 8 shows eye boundaries detected from an actual expressionless face image. FIG. 9 shows a mouth boundary detected from the actual expressionless face image.

Hereinafter, the process performed by the skin model generating units 132A and 132B is further described with reference to FIG. 10.

FIG. 10 shows the smiling face skin model generated by the skin model generating unit 132A (right side in FIG. 10) and the expressionless face skin model generated by the skin model generating unit 132B (left side in FIG. 10).

As described above with reference to FIG. 4, the image data of the smiling face image and the expressionless face image have RGB values and α values. The skin model generating unit 132A changes α values of the pixels inside the mouth boundary and the eye boundaries supplied from the eyes-and-mouth detecting unit 131A among α values of the smiling face image supplied from the eyes-and-mouth detecting unit 131A (FIG. 3) from 1 to 0 (the α values are 1 in all pixels in a stage of being stored in the image data storing unit 121 (FIG. 3), as described above with reference to FIG. 4). The changed α values and the RGB values are regarded as data of the smiling face skin model.

Likewise, the skin model generating unit 132B changes α values of the pixels inside the mouth boundary and the eye boundaries supplied from the eyes-and-mouth detecting unit 131B among α values of the expressionless face image supplied from the eyes-and-mouth detecting unit 131B (FIG. 3) from 1 to 0. The changed α values and the RGB values are regarded as data of the expressionless face skin model.

Hereinafter, the smiling face skin model and the expressionless face skin model are collectively referred to as a skin model as necessary. Also, an RGB value and an α value as a pixel value of each pixel as data of the skin model are collectively referred to as an RGBα value.

The middle part of the right side in FIG. 10 shows the RGB value among the RGB value and the α value as data of the smiling face skin model. The bottom part of the right side in FIG. 10 shows the α value among the RGB value and the α value as data of the smiling face skin model. For example, assume that a pixel having an α value of 0 is not rendered (e.g., an RGB value is 0), the smiling face image as shown at the top on the right side in FIG. 10 without the inside of the eye boundaries and the mouth boundary (RGB value is 0) can be obtained. Therefore, the smiling face skin model is substantially generated by removing the inside of the eye boundaries and the mouth boundary from the smiling face image.

The middle part of the left side in FIG. 10 shows the RGB value among the RGB value and the α value as data of the expressionless face skin model. The bottom part of the left side in FIG. 10 shows the α value among the RGB value and the α value as data of the expressionless face skin model. For example, assume that a pixel having an α value of 0 is not rendered, the expressionless face image as shown at the top on the left side in FIG. 10 without the inside of the eye boundaries and the mouth boundary can be obtained. Therefore, the expressionless face skin model is substantially generated by removing the inside of the eye boundaries and the mouth boundary from the expressionless face image. Note that, the mouth boundary of the expressionless face image is linear as shown in FIG. 10, so that the inside thereof does not exist.

At the bottom part in FIG. 10, an area where the α value is 0 is blackened. Note that, however, black lines indicating the outlines of eyebrows, nose, and lips do not indicate that an α value is 0.

Also, at the bottom part in FIG. 10, the α value is set to 0 in a background area outside the outline of the face.

Now, the process performed by the deformation parameter generating units 133A and 133B is further described with reference to FIGS. 11 to 14B.

Figure 11:
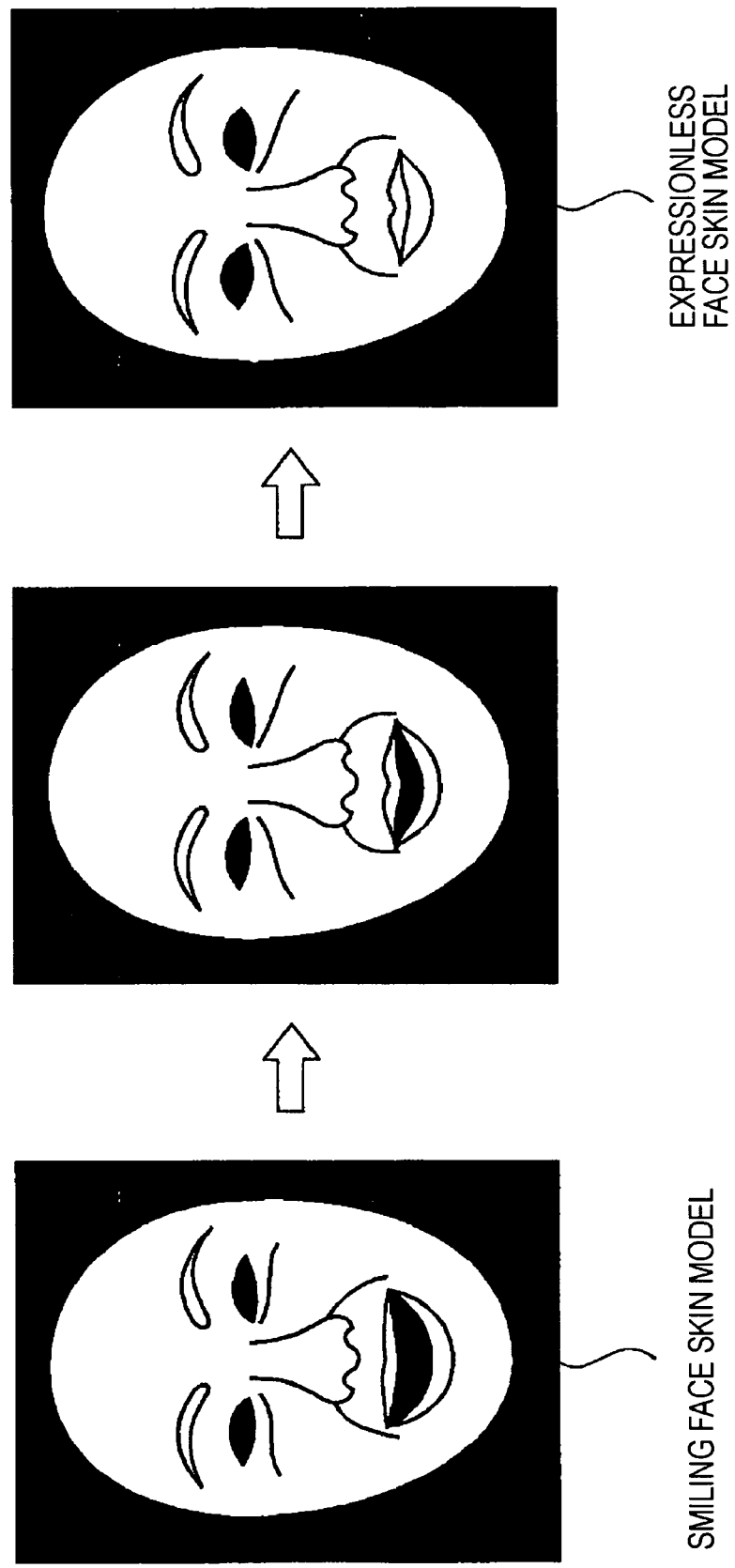
FIG. 11 illustrates a process performed by deformation parameter generating units 133A and 133B.

The deformation parameter generating unit 133A generates a smiling face deformation parameter to seamlessly deform a smiling face skin model to an expressionless face skin model as shown in FIG. 11 by using the smiling face skin model supplied from the skin model generating unit 132A and the expressionless face skin model supplied from the skin model generating unit 132B.

Figure 12:
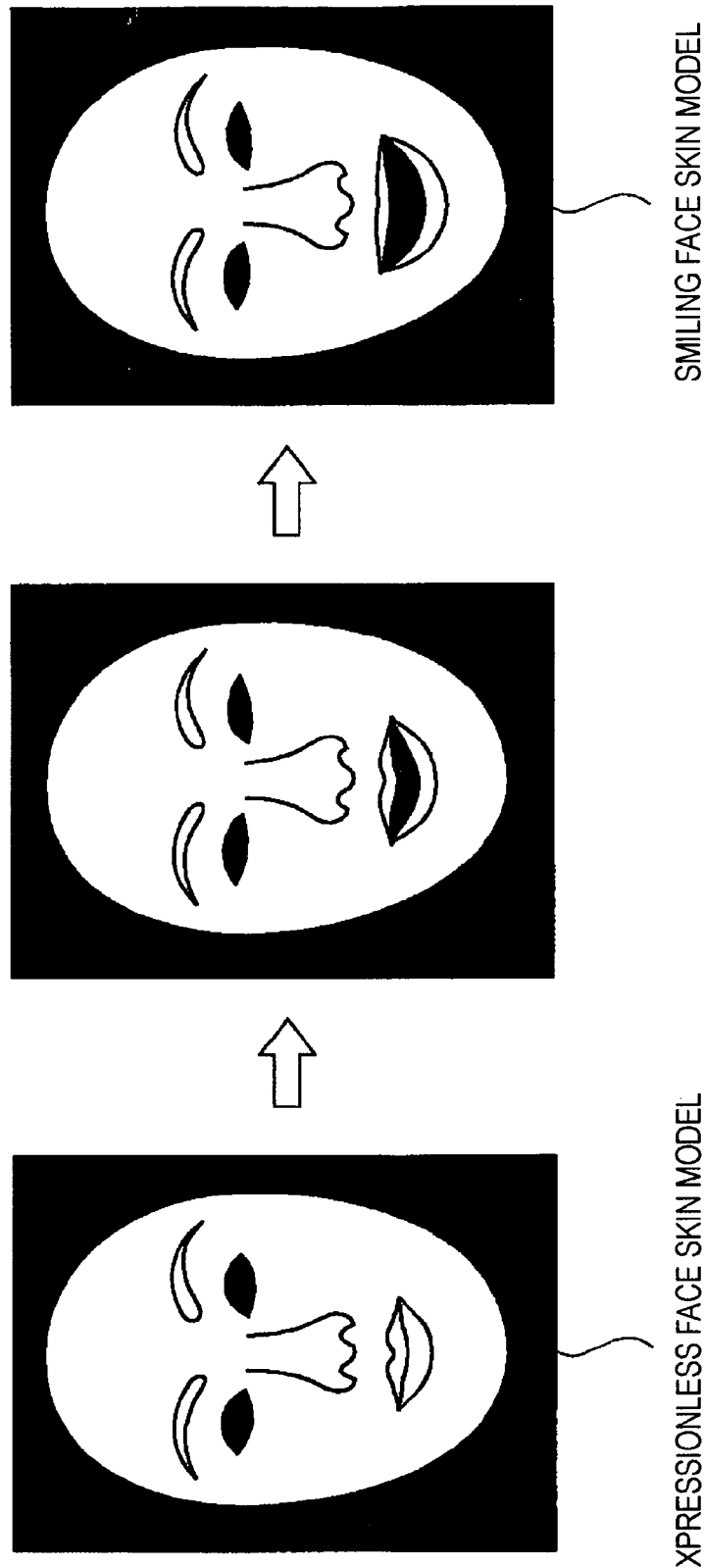
FIG. 12 illustrates a process performed by the deformation parameter generating units 133A and 133B.
Figure 13:
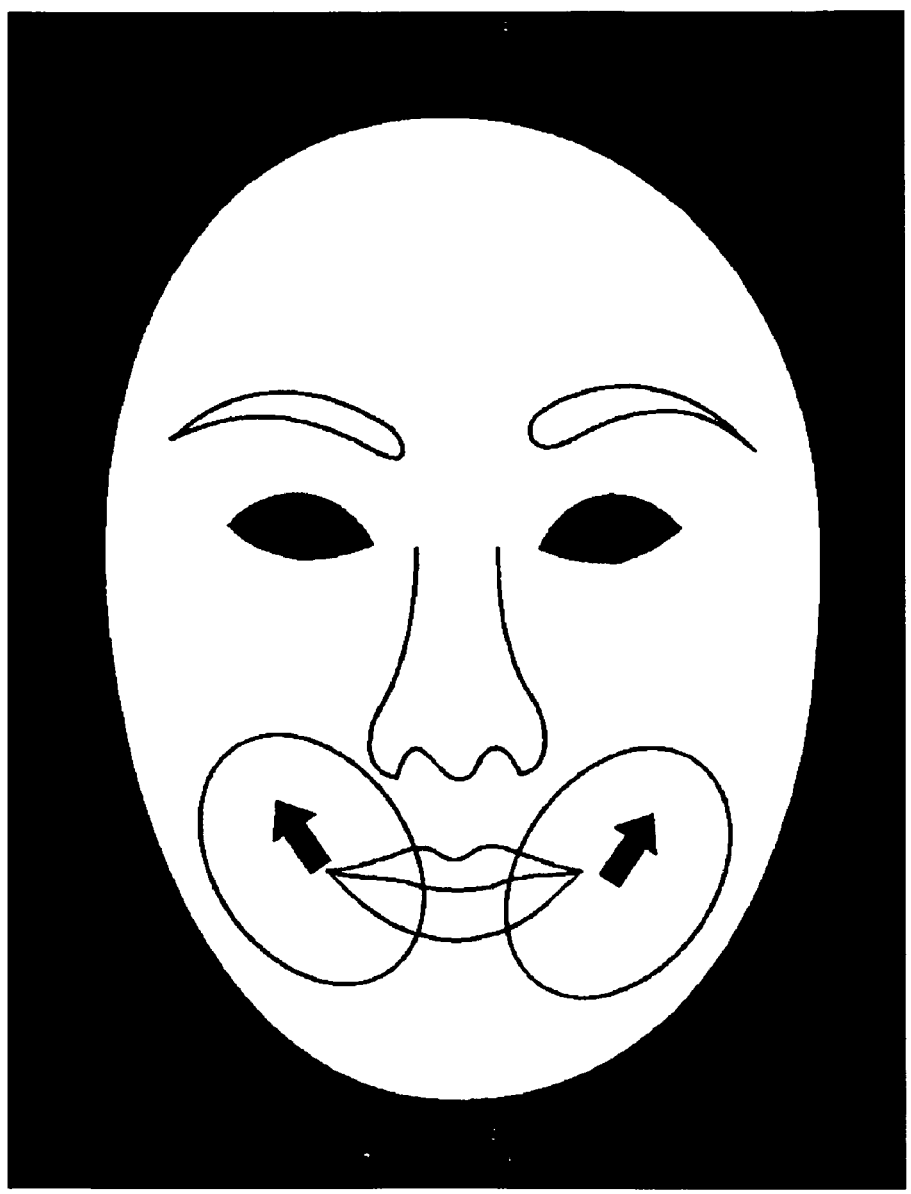
FIG. 13 illustrates a process performed by the deformation parameter generating units 133A and 133B.

Likewise, the deformation parameter generating unit 133B generates an expressionless face deformation parameter to seamlessly deform an expressionless face skin model to a smiling face skin model as shown in FIG. 12 by using the smiling face skin model supplied from the skin model generating unit 132A and the expressionless face skin model supplied from the skin model generating unit 132B.

Hereinafter, the smiling face deformation parameter and the expressionless face deformation parameter are collectively refereed to as deformation parameters as necessary.

A deforming method based on the principle of generating an expression of a face is adopted as a method for seamlessly deforming the smiling face skin model to the expressionless face skin model and a method for seamlessly deforming the expressionless face skin model to the smiling face skin model. Accordingly, deformation similar to an actual change of expression can be performed by simple control. As the deforming method based on the principle of generating an expression of a face, a deforming method shown in FIG. 13 can be used. In this method, directions in which muscles of expression expand/contract (the direction indicated by arrows shown in FIG. 13) and a range in the face affected by the expansion/contraction (the oval areas shown in FIG. 13) are taken into consideration. With this deforming method, complicated deformation can be naturally realized by using a small number of control parameters. The directions in which the muscles of expression expand/contract and the influenced areas can be specified by a user (operator) by operating the input unit 107 (FIG. 1).

For example, when an accurate smiling face skin model can be eventually obtained after seamless deformation of an expressionless face skin model, deformation from the smiling face skin model to the expressionless face skin model can be realized by inversion of deformation from the expressionless face skin model to the smiling face skin model (inverted deformation).

Also, the deformation from the expressionless face skin model to the smiling face skin model (or the deformation from the smiling face skin model to the expressionless face skin model) can be realized by morphing.

Figure 14A:
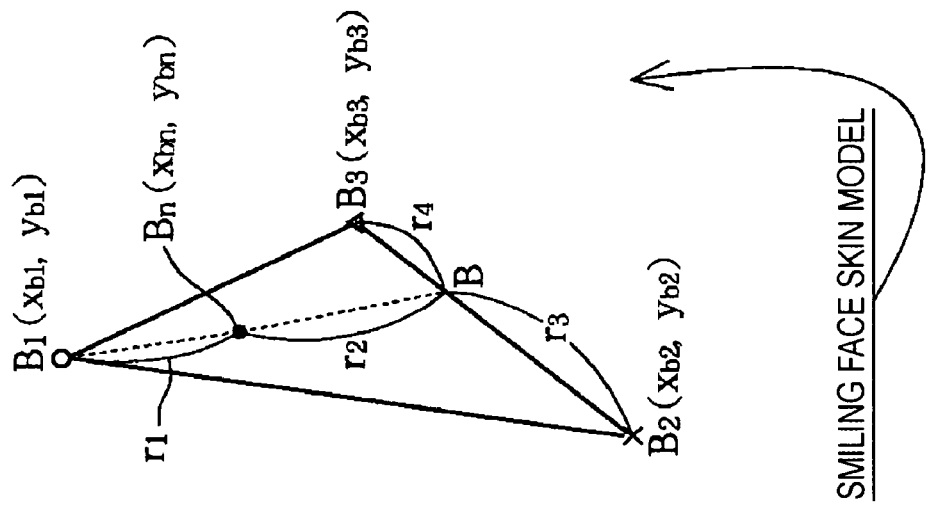
FIGS. 14A and 14B illustrate a process performed by the deformation parameter generating units 133A and 133B.
Figure 14B:
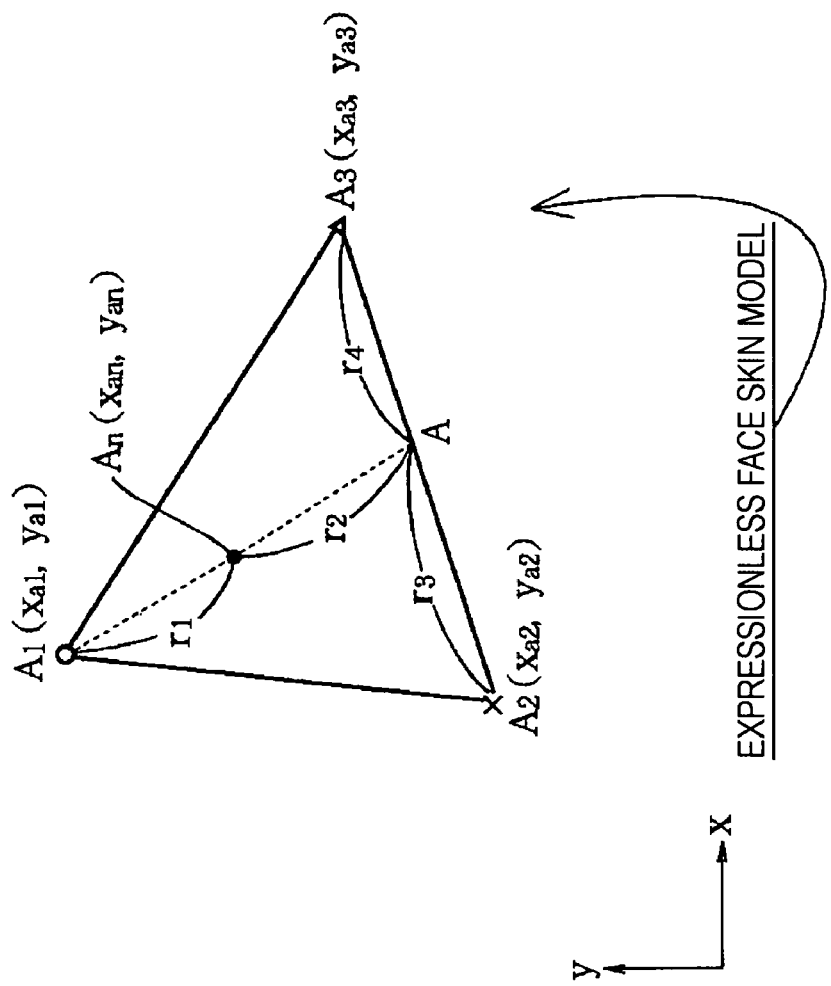

When morphing is adopted as a deforming method from the expressionless face skin model to the smiling face skin model, the deformation parameter generating unit 133A sets a plurality of control points on an image as the expressionless face skin model as shown in FIG. 14A, and also sets control points (hereinafter referred to as corresponding points as necessary) corresponding to the control points set on the expressionless face skin model on an image as the smiling face skin model as shown in FIG. 14B.

In FIG. 14A, an attention is put on a control point $A_1$ among a plurality of control points set on the expressionless face skin model, and two control points $A_2$ and $A_3$ nearer to the control point $A_1$ are shown. On the other hand, FIG. 14B shows corresponding points $B_1$, $B_2$, and $B_3$ set on the smiling face skin model corresponding to the control points $A_1$, $A_2$, and $A_3$.

In FIGS. 14A and 14B, x and y coordinates of a control point $A_i$ are represented by $(x_{ai}, y_{ai})$, and x and y coordinates of a corresponding point $B_i$ are represented by $(x_{bi}, y_{bi})$, wherein i=1, 2, or 3.

In a case where deformation from the expressionless face skin model to the smiling face skin model is performed by morphing, the deformation level of the expressionless face skin model during deformation from the expressionless face skin model to the smiling face skin model (or the deformation level of the smiling face skin model during deformation from the smiling face skin model to the expressionless face skin model) is represented by v. The deformation level v has a real value from 0 to 1. A deformation level v of 0 means that the expressionless face skin model has not been deformed at all. A deformation level v of 1 means that the expressionless face skin model has been completely deformed to the smiling face skin model.

In this case, the coordinates $(xv_i, yv_i)$ of a control point $A_i$ in a state where the expressionless face. skin model has been deformed by the deformation level v can be expressed by the following expression:

$$(xv_i, yv_i) = (1-v) \times (x_{ai}, y_{ai}) + v \times (x_{bi}, y_{bi}).$$

The x and y coordinates of an arbitrary point $A_n$ in a triangle $A_1 A_2 A_3$, having control points $A_1$, $A_2$, and $A_3$ as apexes, are represented by $(x_{an}, y_{an})$. A point where a line segment $A_1 A_n$ through the control points $A_1$ and $A_n$ intersects with a line segment $A_2 A_3$ connecting the control points $A_2$ and $A_3$ is called a point A.

The point $A_n$ internally divides the line segment $A_1 A$ connecting the control points $A_1$ and A at a ratio of $r_1:r_2$. The point A internally divides the line segment $A_2 A_3$ at a ratio of $r_3:r_4$.

A point that internally divides a line segment $B_2 B_3$ connecting the points $B_2$ and $B_3$ corresponding to the control points $A_2$ and $A_3$ at a ratio of $r_3:r_4$ is a point B. A point that internally divides a line segment $B_1 B$ connecting the point $B_1$ corresponding to the control point $A_1$ and the point B at a ratio of $r_1:r_2$ is a point $B_n$. The x and y coordinates of the point $B_n$ are $(x_{bn}, y_{bn})$.

In this case, the coordinates of the point $A_n$ $(xv_n, yv_n)$ in a state where the expressionless face skin model has been deformed by the level represented by the deformation level v can be expressed by the following expression:

$$(xv_n, yv_n) = (1-v) \times (x_{an}, y_{an}) + v \times (x_{bn}, y_{bn}).$$

The coordinates of the point $B_n$ $(x_{bn}, y_{bn})$ can be calculated by using the coordinates of the control points $A_1$, $A_2$, and $A_3$ and the corresponding points $B_1$, $B_2$, and $B_3$. Thus, the coordinates of an arbitrary point on the triangle $A_1 A_2 A_3$ (including a point on the line segments $A_1 A_2$, $A_2 A_3$, and $A_3 A_1$) in a state where the expressionless face skin model has been deformed by the level represented by the deformation level v can be calculated by using the coordinates of the control points $A_1$, $A_2$, and $A_3$ and the corresponding points $B_1$, $B_2$, and $B_3$.

In this case, in the deformation parameter generating unit 133B, the coordinates of the control points $A_1$, $A_2$, and $A_3$ and the corresponding points $B_1$, $B_2$, and $B_3$ are obtained as an expressionless face deformation parameter used to seamlessly deform the expressionless face skin model to the smiling face skin model.

A state where the expressionless face skin model has been deformed by a deformation level v corresponds to a state where the smiling face skin model has been deformed by a deformation level 1-v. Also, the coordinates of an arbitrary point on the triangle $B_1B_2B_3$ on the smiling face skin model in a state where the smiling face skin model has been deformed by the level represented by the deformation level 1-v can be calculated by using the coordinates of the control points $A_1$, $A_2$, and $A_3$ and the corresponding points $B_1$, $B_2$, and $B_3$.

Therefore, in the deformation parameter generating unit 133A, the coordinates of the control points $A_1$, $A_2$, and $A_3$ and the corresponding points $B_1$, $B_2$, and $B_3$ are obtained as a smiling face deformation parameter used to seamlessly deform the smiling face skin model to the expressionless face skin model. The smiling face deformation parameter matches with the expressionless face deformation parameter obtained in the deformation parameter generating unit 133B.

Figure 15:
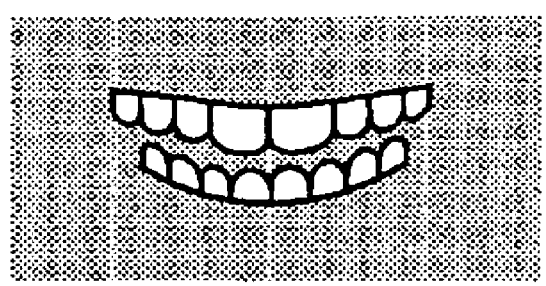
FIG. 15 shows an inside-of-mouth model.

FIG. 15 shows the inside-of-mouth model generated by the inside-of-mouth model generating unit 134 shown in FIG. 3.

In the inside-of-mouth model generating unit 134, the teeth and gums shown in FIG. 15, which are displayed inside the mouth boundary supplied from the eyes-and-mouth detecting unit 131A, are extracted as an inside-of-mouth model from the smiling face image supplied from the eyes-and-mouth detecting unit 131A (FIG. 3).

Figure 16:
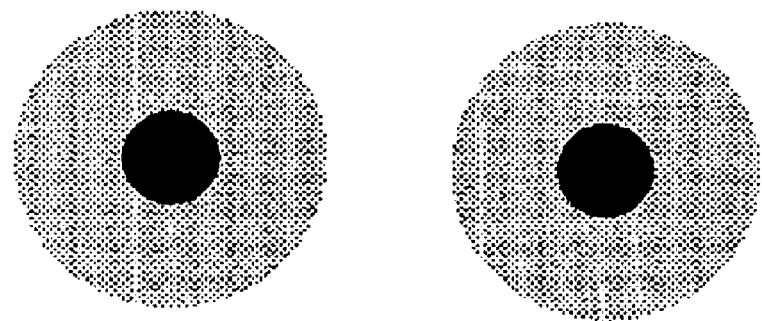
FIG. 16 shows an eyeball model.

FIG. 16 shows the eyeball model generated in the eyeball model generating unit 136 shown in FIG. 3.

In the eyeball model generating unit 136, black eyes in the right and left eyeballs in an expressionless face image are recognized on the basis of the expressionless face image and the eye boundaries supplied from the eyes-and-mouth detecting unit 131B, and the standard eyeball model is deformed so as to match with the distance between the black eyes in the right and left eyeballs and the size of the black eyes. Then, in the eyeball model generating unit 136, the black eyes of the standard eyeball model after deformation are replaced by the black eyes recognized in the expressionless face image, so that the eyeball model shown in FIG. 16 is generated.

Figure 17:
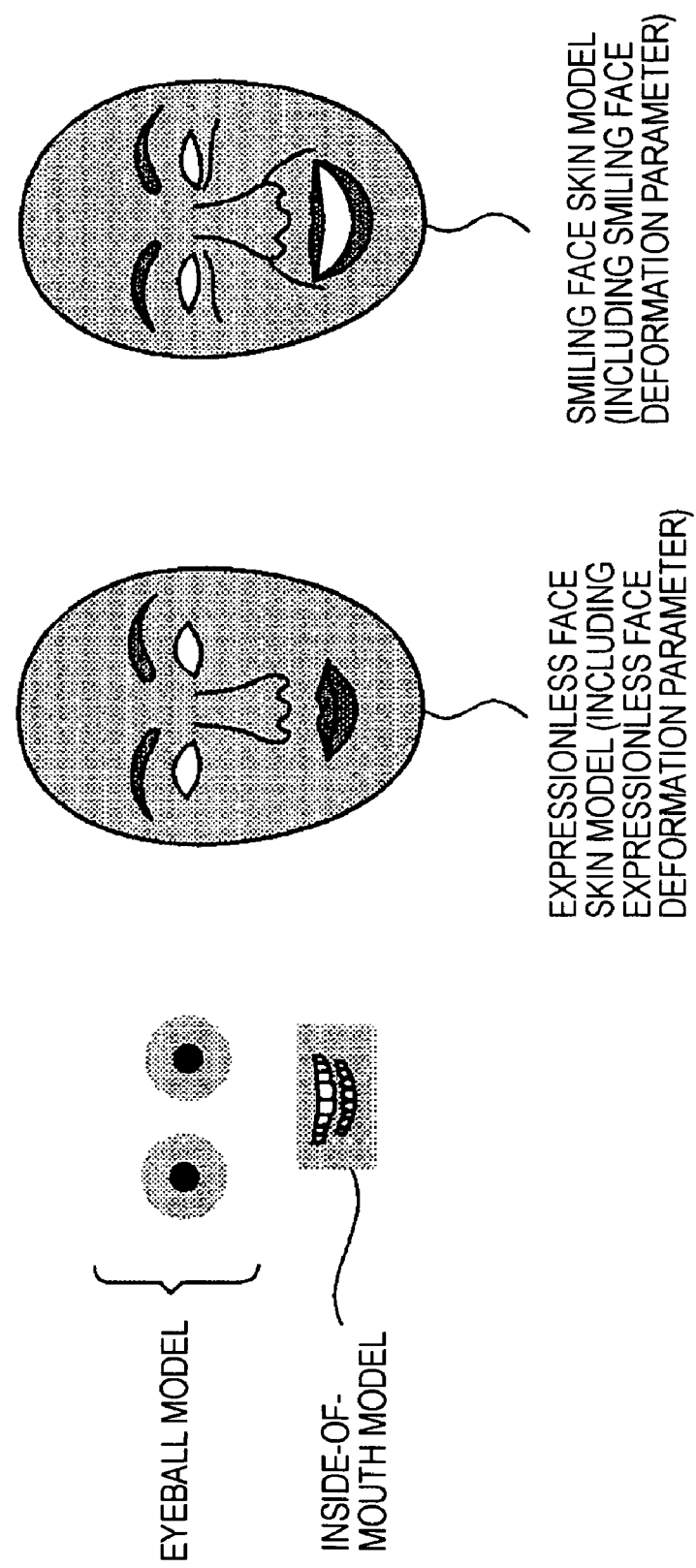
FIG. 17 shows animation parameters.

FIG. 17 schematically shows animation parameters output from the output control unit 137 shown in FIG. 3.

As shown in FIG. 17, the output control unit 137 outputs the following animation data: the smiling face skin model and the smiling face deformation parameter supplied from the deformation parameter generating unit 133A; the expressionless face skin model and the expressionless face deformation parameter supplied from the deformation parameter generating unit 133B; the inside-of-mouth model supplied from the inside-of-mouth model generating unit 134; and the eyeball model supplied from the eyeball model generating unit 136.

Figure 18:
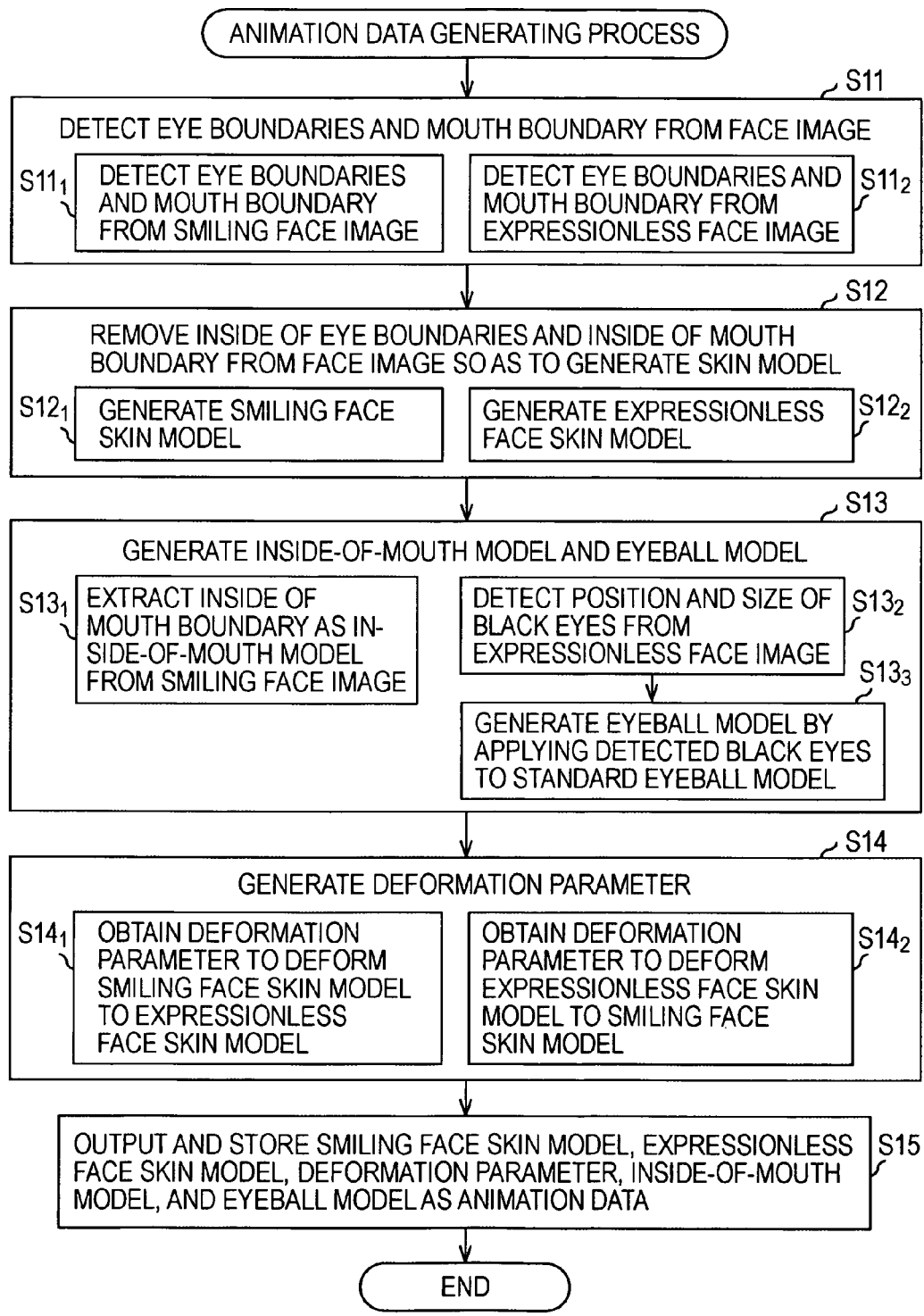
FIG. 18 is a flowchart illustrating an animation data generating process.

Hereinafter, an animation data generating process performed by the animation data generating unit 122 shown in FIG. 3 is described with reference to the flowchart shown in FIG. 18.

First, in step S11, eye boundaries and a mouth boundary are detected from a face image stored in the image data storing unit 121, and then the process proceeds to step S12.

More specifically, in step S$11_1$, the eyes-and-mouth detecting unit 131A detects eye boundaries and a mouth boundary from the smiling face image stored in the image data storing unit 121, and supplies the eye boundaries and the mouth boundary together with the smiling face image to the skin model generating unit 132A and the inside-of-mouth model generating unit 134.

Also, in step S$11_2$, the eyes-and-mouth detecting unit 131B detects eye boundaries and a mouth boundary from the expressionless face image stored in the image data storing unit 121, and supplies the eye boundaries and the mouth boundary together with the expressionless face image to the skin model generating unit 132B and the eyeball model generating unit 136.

In step S12, a skin model is generated by removing the inside of the eye boundaries and the mouth boundary from the face image, and then the process proceeds to step S13.

More specifically, in step S$12_1$, the skin model generating unit 132A removes the inside of the eye boundaries and the mouth boundary supplied from the eyes-and-mouth detecting unit 131A from the smiling face image supplied from the eyes-and-mouth detecting unit 131A so as to generate a smiling face skin model, and supplies the smiling face skin model to the deformation parameter. generating units 133A and 133B.

Also, in step S$12_2$, the skin model generating unit 132B removes the inside of the eye boundaries and the mouth boundary supplied from the eyes-and-mouth detecting unit 131B from the expressionless face image supplied from the eyes-and-mouth detecting unit 131B so as to generate an expressionless face skin model, and supplies the expressionless face skin model to the deformation parameter generating units 133A and 133B.

In step S13, an inside-of-mouth model and an eyeball model are generated, and then the process proceeds to step S14.

More specifically, in step S$13_1$, the inside-of-mouth model generating unit 134 generates an inside-of-mouth model inside the mouth boundary of the smiling face image by using the smiling face image and the mouth boundary supplied from the eyes-and-mouth detecting unit 131A and supplies the inside-of-mouth model to the output control unit 137.

Also, in step S$13_2$, the eyeball model generating unit 136 recognizes or detects (the position and size) of the black eyes in the right and left eyeballs in the expressionless face image from the expressionless face image and the eye boundaries supplied from the eyes-and-mouth detecting unit 131B, and then the process proceeds to step S$13_3$. In step S$13_3$, the eyeball model generating unit 136 deforms the standard eyeball model stored in the standard eyeball model storing unit 135 in accordance with the black eyes in the right and left eyeballs in the expressionless face image and replaces the black eyes of the standard eyeball model after deformation by the black eyes recognized in the expressionless face image so as to generate an eyeball model, and then supplies the eyeball model to the output control unit 137.

In step S14, deformation parameters are generated, and then the process proceeds to step S15.

More specifically, in step S$14_1$, the deformation parameter generating unit 133A generates a smiling face deformation parameter used to deform the smiling face skin model to the expressionless face skin model by using the smiling face skin model supplied from the skin model generating unit 132A and the expressionless face skin model supplied from the skin model generating unit 132B, and supplies the smiling face deformation parameter together with the smiling face skin model to the output control unit 137.

Also, in step S$14_2$, the deformation parameter generating unit 133B generates an expressionless face deformation parameter used to deform the expressionless face skin model to the smiling face skin model by using the smiling face skin model supplied from the skin model generating unit 132A and the expressionless face skin model supplied from the skin model generating unit 132B, and supplies the expressionless face deformation parameter together with the expressionless face skin model to the output control unit 137.

In step S15, the output control unit 137 outputs animation data: the smiling face skin model and the smiling face deformation parameter supplied from the deformation parameter generating unit 133A; the expressionless face skin model and the expressionless face deformation parameter supplied from the deformation parameter generating unit 133B; the inside-of-mouth model supplied from the inside-of-mouth model generating unit 134; and the eyeball model supplied from the eyeball model generating unit 136. The animation data is stored in the animation data storing unit 123, so that the animation data generating process ends.

As described above, in the animation data generating unit 122, eyeballs and the inside of the mouth (teeth, gums, and tongue) that are at the back of the skin of the face and that do not change in shape with a change of expression of the face are separated from the face image (smiling face image and expressionless face image). Accordingly, a skin model generated by removing the inside of eye boundaries and a mouth boundary from a face image, a deformation parameter used to deform the skin model, an eyeball model, and an inside-of-mouth model can be obtained as animation data. By generating a face image by using the animation data, it can be prevented that the animation of the face image becomes unnatural in which the eyeballs and the inside of the mouth change with a change of expression of the face.

Figure 19:
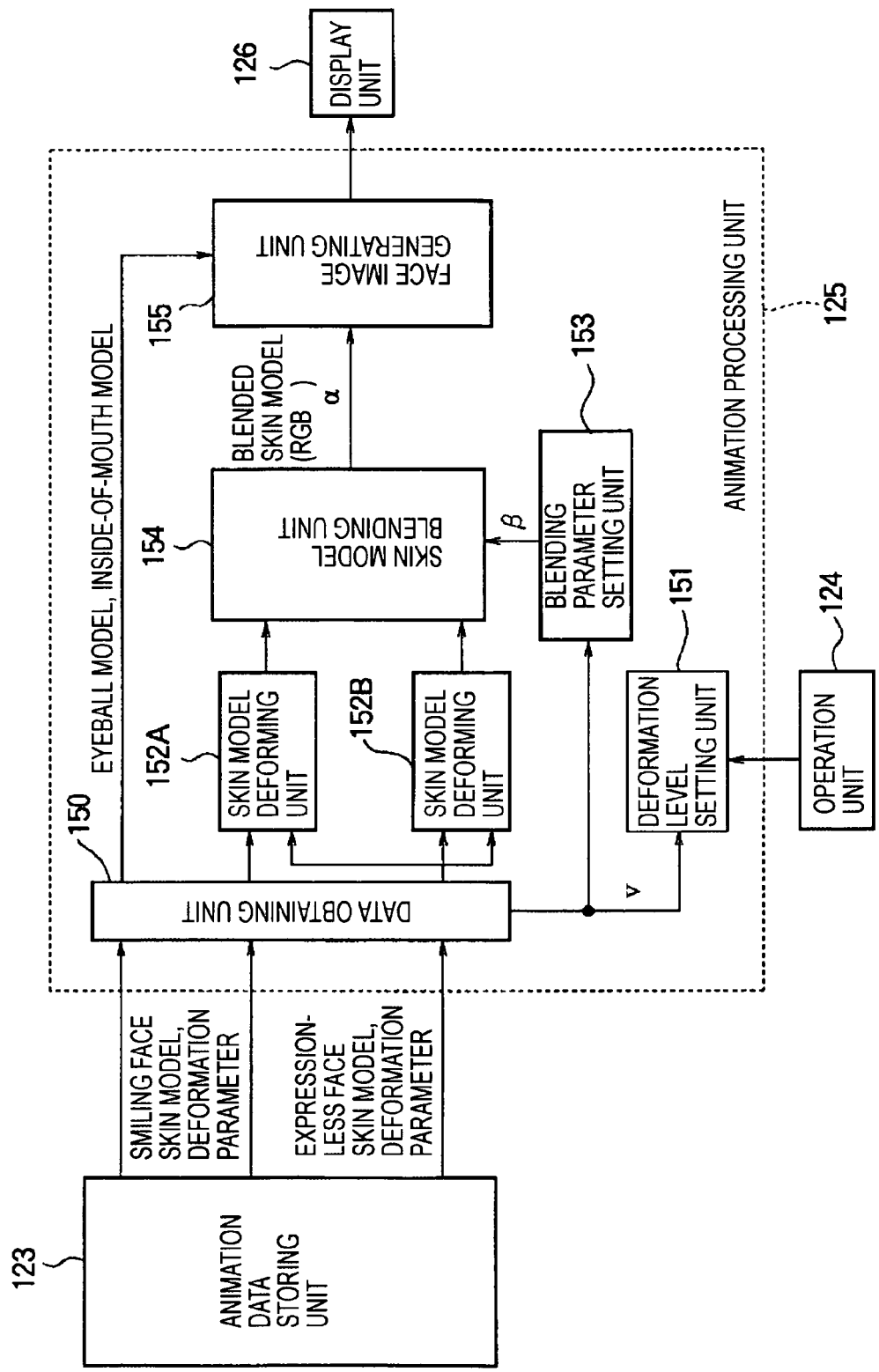
FIG. 19 is a block diagram showing an example of a configuration of an animation processing unit 125.

FIG. 19 shows an example of a configuration of the animation processing unit 125 shown in FIG. 2.

A data obtaining unit 150 reads and obtains the animation data stored in the animation data storing unit 123, that is, the smiling face skin model and the smiling face deformation parameter; the expressionless face skin model and the expressionless face deformation parameter; the inside-of-mouth model, and the eyeball model. Then, the data obtaining unit 150 supplies the smiling face skin model and the smiling face deformation parameter to a skin model deforming unit 152A, supplies the expressionless face skin model and the expressionless face deformation parameter to a skin model deforming unit 152B, and supplies the inside-of-mouth model and the eyeball model to a face image generating unit 155. Alternatively, the data obtaining unit 150 can obtain the animation data by receiving it through a network, such as the Internet.

A deformation level setting unit 151 sets a deformation level v, which indicates a level of deformation from one of a smiling face image and an expressionless face image to the other, and supplies the deformation level v to the skin model deforming units 152A and 152B and a blending parameter setting unit 153.

That is, the deformation level setting unit 151 sets the deformation level v to a real value in the range from 0 to 1 in accordance with an operation signal supplied from the operation unit 124.

Herein, the deformation level v set by the deformation level setting unit 151 indicates a level of deformation of the expressionless face skin model from the expressionless face skin model corresponding to an expressionless face to the smiling face skin model corresponding to a smiling face, as described above with reference to FIGS. 14A and 14B.

In this case, for example, a deformation level v=0 indicates a state of (an expressionless face corresponding to) the expressionless face skin model during seamless deformation from the expression face skin model to the smiling face skin model. On the other hand, a deformation level v=1 indicates a state of (a smiling face corresponding to) the smiling face skin model. Also, a deformation level v=0.5 indicates the just middle state in seamless deformation from the expressionless face skin model to the smiling face skin model.

The deformation setting unit 151 can set the deformation level v in accordance with an operation signal supplied from the operation unit 124. Also, the deformation setting unit 151 can set the deformation level v so that the deformation level v periodically increases or decreases at a predetermined step width of 0.1. In that case, the deformation level v changes as follows, for example: 0, 0.1, 0.2, . . . ; 1, 0.9, 0.8, . . . ; 0, 0.1, 0.2, . . . ; or 1, 0, 0.1, 0.2, . . . .

The skin model deforming unit 152A deforms the smiling face skin model (first skin model) supplied from the data obtaining unit 150 to a smiling face deformed skin model (first deformed skin model) that is deformed in accordance with the deformation level v supplied from the deformation level setting unit 151 by using the smiling face deformation parameter (first deformation parameter) supplied from the data obtaining unit 150, and then supplies the smiling face deformed skin model to a skin model blending unit 154.

More specifically, assume that the morphing described above with reference to FIGS. 14A and 14B is adopted as a deforming method. When an attention is put on a corresponding point $B_i$ to a control point $A_i$ in FIGS. 14A and 14B, the skin model deforming unit 152A moves the corresponding point $B_i$ on the smiling face skin model to a point of the coordinates $(xBv_i, yBv_i)$ expressed by an expression $(xBv_i, yBv_i) = v \times (x_{bi}, y_{bi}) + (1-v) \times (x_{ai}, y_{ai})$, so as to obtain a smiling face deformed skin model generated by deforming the smiling face skin model in accordance with the deformation level v.

In the above expression $(xBv_i, yBv_i) = v \times (x_{bi}, y_{bi}) + (1-v) \times (x_{ai}, y_{ai})$, the coordinates $(x_{bi}, y_{bi})$ of the corresponding point $B_i$ and the coordinates $(x_{ai}, y_{ai})$ of the control point $A_i$ are smiling face deformation parameters.

Moving the corresponding point $B_i$ to the point of the coordinates $(xBv_i, yBv_i)$ means setting an RGBα value as a pixel value of the corresponding point $B_i$ to a pixel value of the point of the coordinates $(xBv_i, yBv_i)$.

As the skin model deforming unit 152A, the skin model deforming unit 152B deforms the expressionless face skin model (second skin model) supplied from the data obtaining unit 150 to an expressionless face deformed skin model (second deformed skin model) that is deformed in accordance with the deformation level v supplied from the deformation level setting unit 151 by using the expressionless face deformation parameter (second deformation parameter) supplied from the data obtaining unit 150, and then supplies the expressionless face deformed skin model to the skin model blending unit 154.

More specifically, assume that the morphing described above with reference to FIGS. 14A and 14B is adopted as a deforming method. When an attention is put on a control point $A_i$ in FIGS. 14A and 14B, the skin model deforming unit 152B moves the control point $A_i$ on the expressionless face skin model to a point of the coordinates $(xAv_i, yAv_i)$ expressed by an expression $(xAv_i, yAv_i) = (1-v) \times (x_{ai}, y_{ai}) + v \times (x_{bi}, y_{bi})$, so as to obtain an expressionless face deformed skin model generated by deforming the expressionless face skin model in accordance with the deformation level v.

The blending parameter setting unit 153 sets a blending parameter β, which indicates a level of blending the smiling face deformed skin model obtained in the skin model deforming unit 152A and the expressionless face deformed skin model obtained in the skin model deforming unit 152B in accordance with the deformation level v supplied from the deformation level setting unit 151, and supplies the blending parameter β to the skin model blending unit 154. For example, the blending parameter setting unit 153 sets the deformation level v to the blending parameter β and supplies the set blending parameter to the skin model blending unit 154.

Herein, the blending parameter setting unit 153 can calculate a nonlinear function f(v) that monotonically increasing smoothly in the range from 0 to 1 with respect to an argument v in the range from 0 to 1 by using the deformation level v as an argument, and can set the calculation result to the blending parameter β.

When the deformation level v is 0 or 1, the blending parameter β is desirably set so as to match with the deformation level v.

The skin model blending unit 154 blends the smiling face deformed skin model supplied from the skin model deforming unit 152A and the expressionless face deformed skin model supplied from the skin model deforming unit 152B in accordance with the blending parameter supplied from the blending parameter setting unit 153, and supplies a blended skin model obtained as a result to the face image generating unit 155.

Assume that the pixel value of the pixel at coordinates. (x, y) in an image as the smiling face deformed skin model is represented by pa(x, y) and that the pixel value of the pixel at coordinates (x, y) in an image as the expressionless face deformed skin model is represented by pb(x, y). In that case, the skin model blending unit 154 calculates the pixel value p(x, y) of the pixel at coordinates (x, y) in an image as a blended skin model in accordance with an expression p(x, y)=β×pa(x, y)+(1−β)×pb(x, y). As the pixel value p(x, y), respective values of R, G, and B and an α value are calculated.

The face image generating unit 155 blends the blended skin model supplied from the skin model blending unit 154 and the eyeball model and the inside-of-mouth model supplied from the data obtaining unit 150 so as to generate a face image (intermediate image) of an expression according to the deformation level v, and supplies the face image to the display unit 126.

That is, the face image generating unit 155 blends an image as the blended skin model and an image as the eyeball model or the inside-of-mouth model by so-called a blending. More specifically, assuming that the RGB value and a value of the pixel at coordinates (x, y) in the image as the blended skin model are represented by p1(x, y) and α(x, y) and that the RGB value of the pixel at coordinates (x, y) in the image as the eyeball model or the inside-of-mouth model is represented by p2(x, y), the face image generating unit 155 calculates the RGB value p3(x, y) of the pixel at coordinates (x, y) in a blended face image, generated by blending the blended skin model, the eyeball model, and the inside-of-mouth model, in accordance with the expression p3(x, y)=α(x, y)×p1(x, y)+(1−α(x, y))×p2(x, y).

The face image generating unit 155 performs filtering by an LPF (low-pass filter) on the α value of the blended skin model. By using the α value after filtering, the RGB value p3(x, y) of the bended face image can be calculated in accordance with the expression p3(x, y)=α(x, y)×p1(x, y)+(1−α(x, y))×p2(x, y). In this case, boundaries between the blended skin model and the eyeball model or the inside-of-mouth model in the blended face image can be smoothed.

Hereinafter, a face image generating process performed in the animation processing unit 125 shown in FIG. 19 is described with reference to the flowchart shown in FIG. 20.

First, in step S30, the data obtaining unit 150 obtains the animation data stored in the animation data storing unit 123 by reading it. Among the animation data, the smiling face skin model and the smiling face deformation parameter are supplied to the skin model deforming unit 152A, the expressionless face skin model and the expressionless face deformation parameter are supplied to the skin model deforming unit 152B, and the inside-of-mouth model and the eyeball model are supplied to the face image generating unit 155. Then, the process proceeds to step S31.

In step S31, the deformation level setting unit 151 sets a deformation level v and supplies the deformation. level v to the skin model deforming units 152A and 152B and the blending parameter setting unit 153. Then, the process proceeds to step S32. In step S32, the blending parameter setting unit 153 sets a blending parameter β in accordance with the deformation level v supplied from the deformation level setting unit 151 and supplies the blending parameter β to the skin model blending unit 154. Then, the process proceeds to step S33.

In step S33, the skin model is deformed in accordance with the deformation level v, and the process proceeds to step S34.

More specifically, in step S$33_1$, the skin model deforming unit 152A deforms the smiling face skin model supplied from the data obtaining unit 150 in accordance with the deformation level v supplied from the deformation level setting unit 151 by using the smiling face deformation parameter supplied from the data obtaining unit 150, and supplies a smiling face deformed skin model obtained as a result to the skin model blending unit 154.

Also, in step S$33_2$, the skin model deforming unit 152B deforms the expressionless face skin model supplied from the data obtaining unit 150 in accordance with the deformation level v supplied from the deformation level setting unit 151 by using the expressionless face deformation parameter supplied from the data obtaining unit 150, and supplies an expressionless face deformed skin model obtained as a result. to the skin model blending unit 154.

In step S34, the skin model blending unit 154 blends the smiling face deformed skin model supplied from the skin model deforming unit 152A and the expressionless face deformed skin model supplied from the skin model deforming unit 152B in accordance with the blending parameter β supplied from the blending parameter setting unit 153, and supplies a blended skin model obtained as a result to the face image generating unit 155. Then, the process proceeds to step S35.

In step S35, the face image generating unit 155 blends the blended skin model supplied from the skin model blending unit 154 and the eyeball model and the inside-of-mouth model supplied from the data obtaining unit 150 so as to generate a blended face image of an expression according to the deformation level v. Then, the face image generating process ends.

The blended face image generated in the above-described manner is supplied from the face image generating unit 155 to the display unit 126 and is displayed therein.

Figure 20:
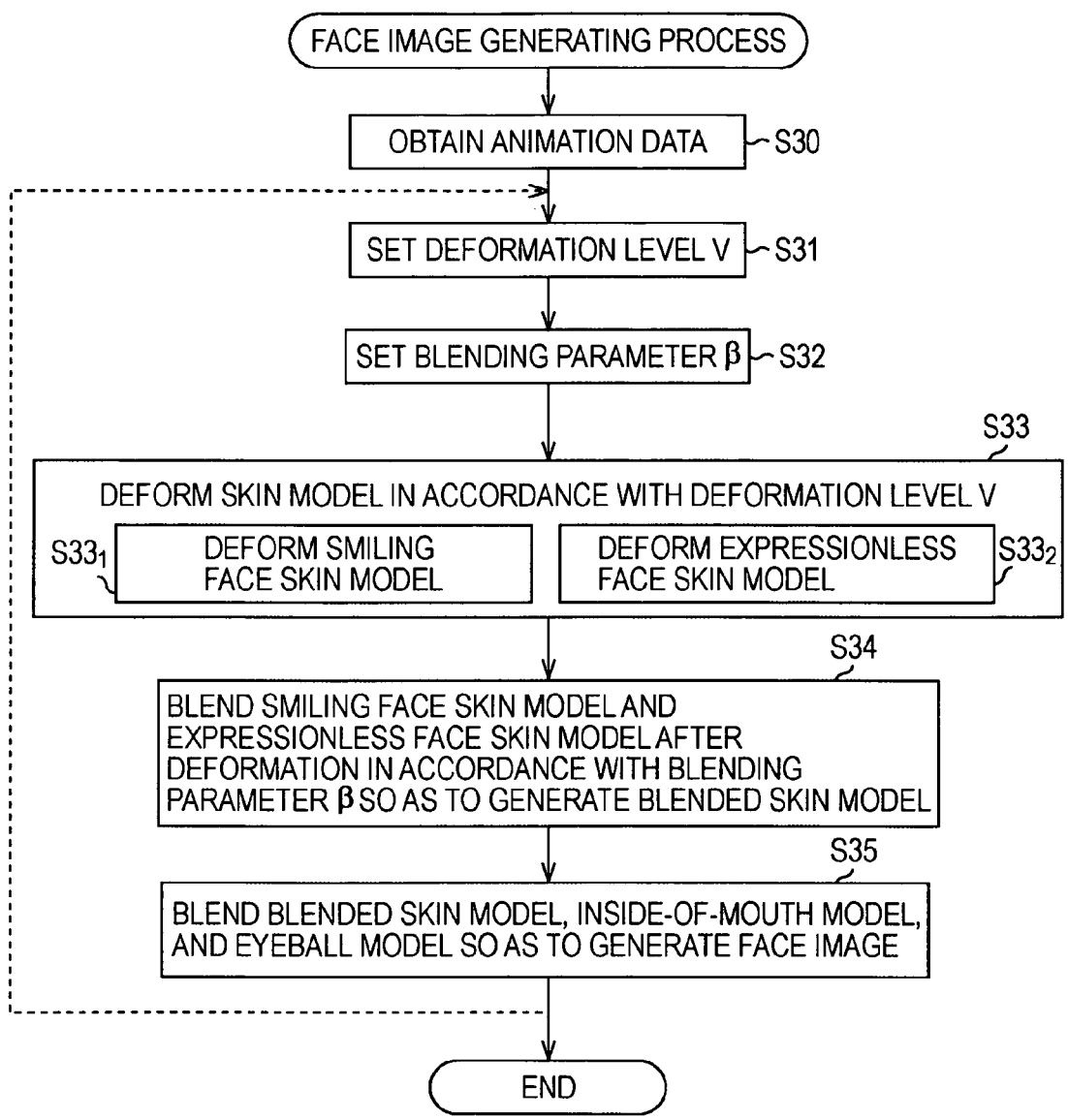
FIG. 20 is a flowchart illustrating a face image generating process.
Figure 21:
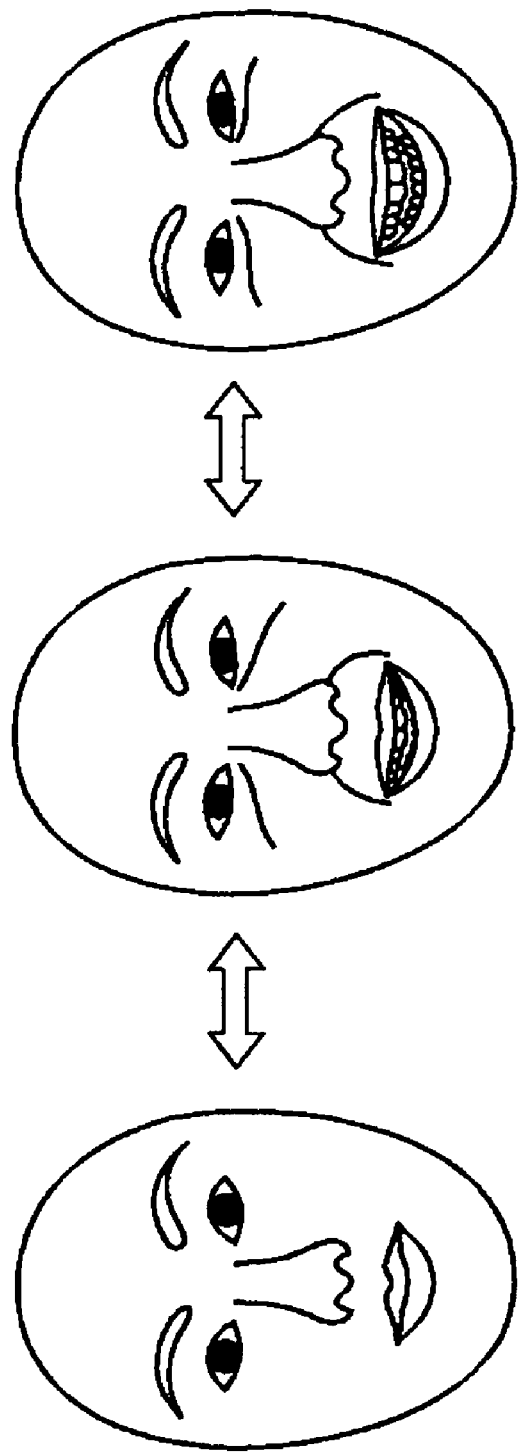
FIG. 21 shows animation of faces.

As indicated by a broken line shown in FIG. 20, steps S31 to S35 can be repeated while changing the deformation level v set in step S31 at a predetermined step width. Accordingly, natural animation of face images that are seamlessly deformed from one of a smiling face and an expressionless face to the other can be displayed, as shown in FIG. 21.

FIGS. 22 to 27 show actual face images obtained through the face image generating process.

Figure 22:
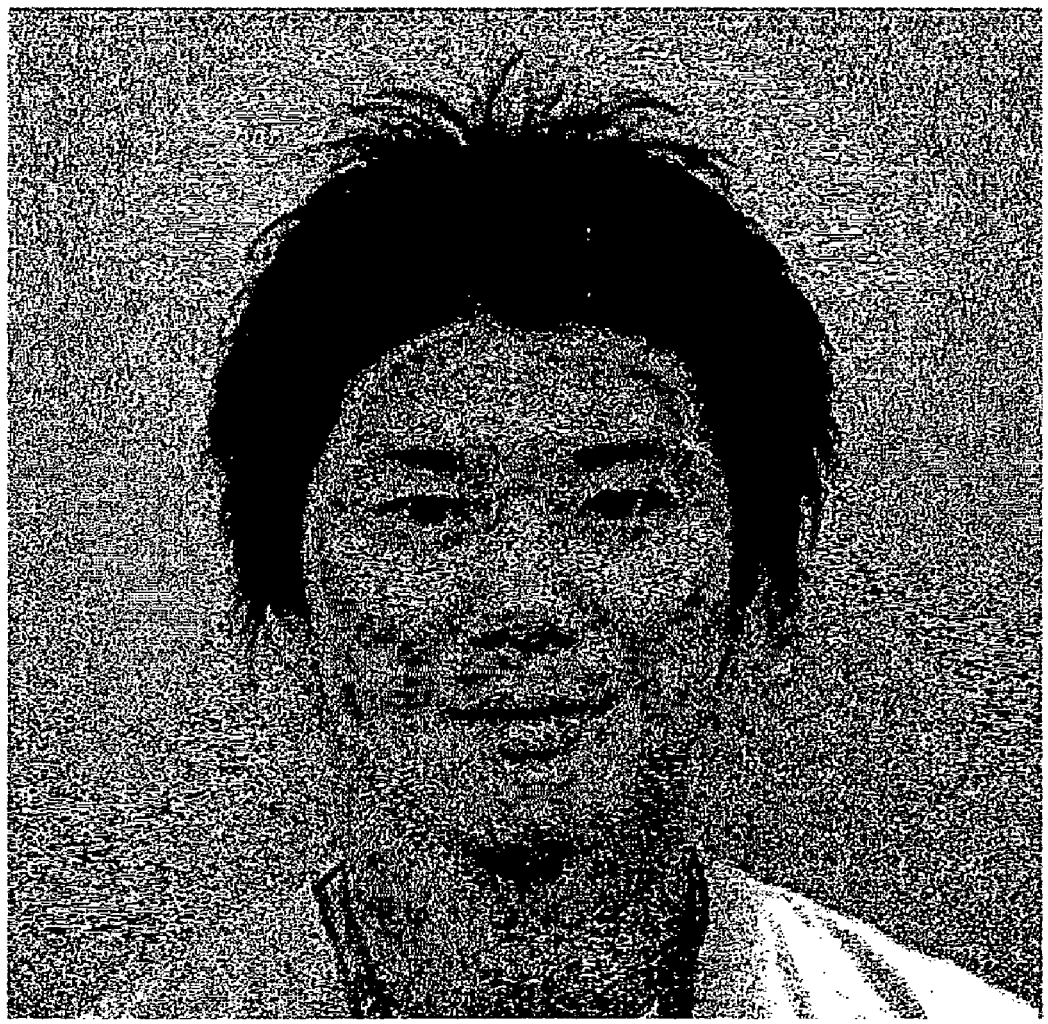
FIG. 22 shows an actual face image obtained through the face image generating process.
Figure 23:
FIG. 23 shows an actual face image obtained through the face image generating process.
Figure 24:
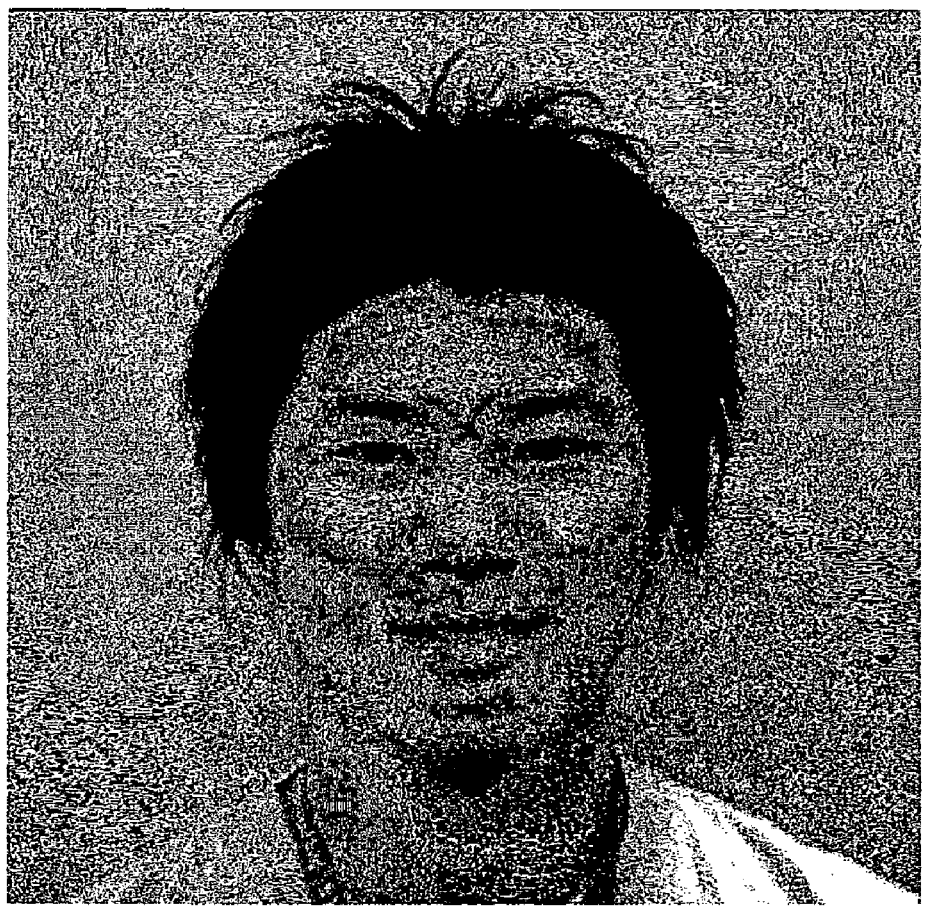
FIG. 24 shows an actual face image obtained through the face image generating process.
Figure 25:
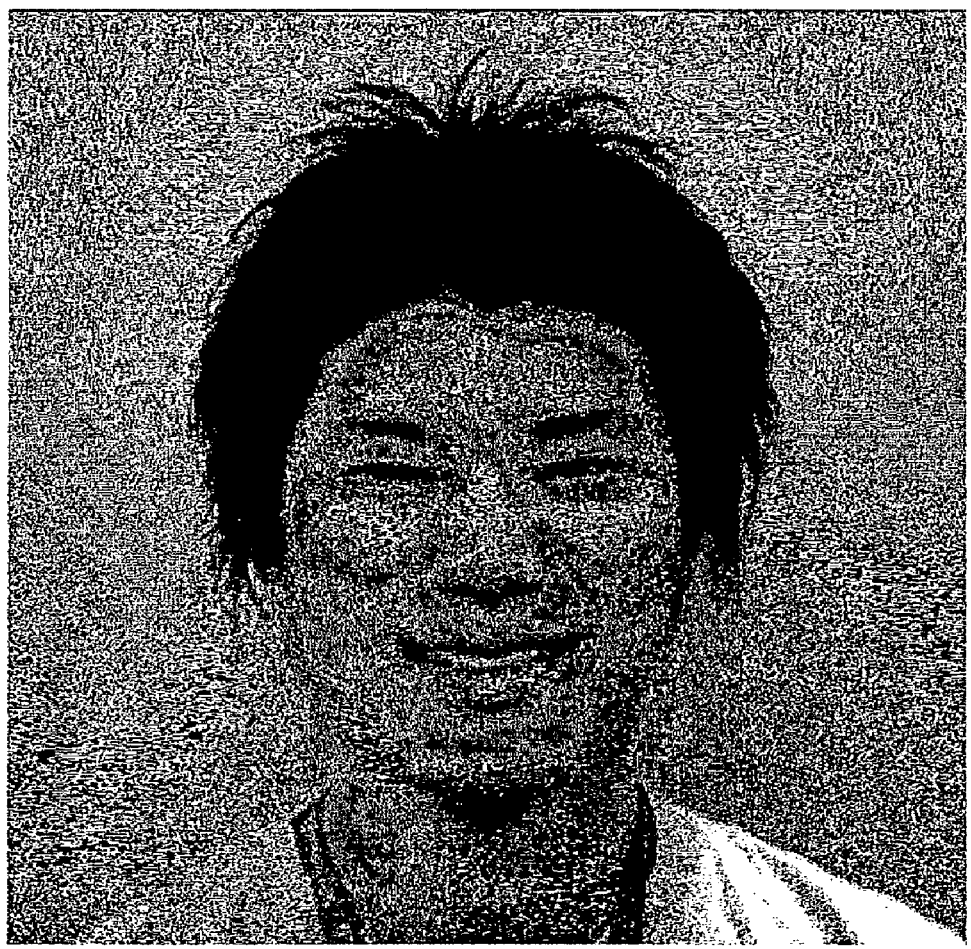
FIG. 25 shows an actual face image obtained through the face image generating process.
Figure 26:
FIG. 26 shows an actual face image obtained through the face image generating process.
Figure 27:
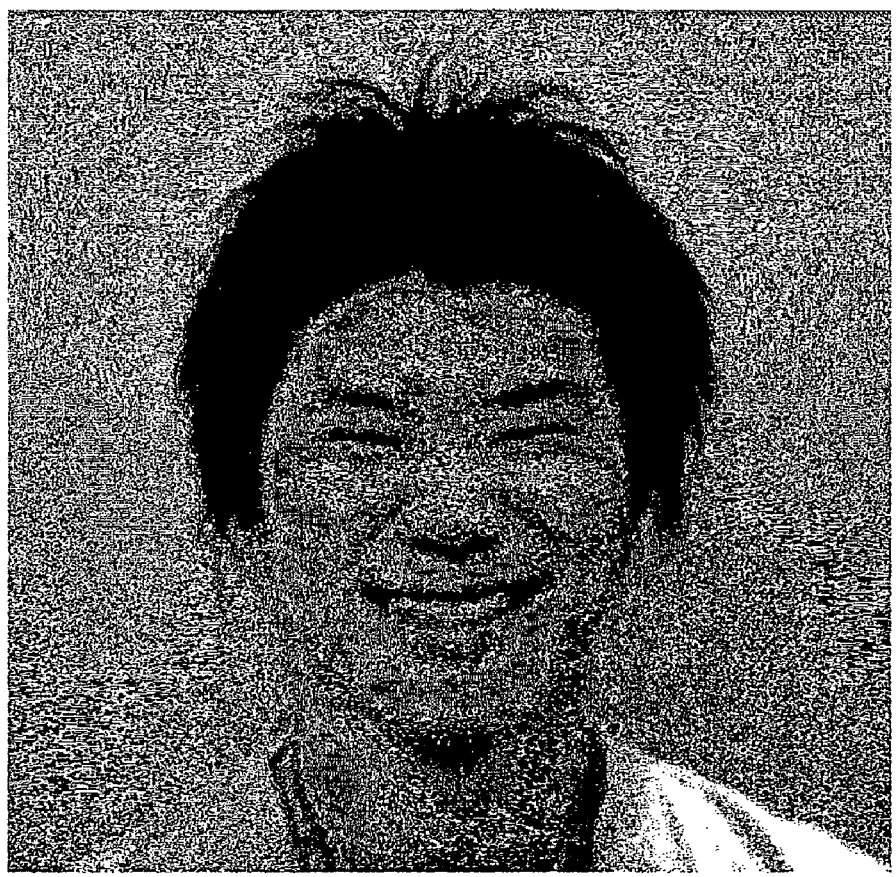
FIG. 27 shows an actual face image obtained through the face image generating process.

FIG. 22 shows an expressionless face image, and FIG. 23 shows a smiling face image. FIGS. 24 to 27 show blended face images as intermediate images obtained by using the expressionless face image shown in FIG. 22 and the smiling face image shown in FIG. 23. The blended face images shown in FIGS. 24 to 27 are obtained by increasing the deformation level v.

In the face image generating process performed by the animation processing unit 125, a skin model generated by removing the inside of eye boundaries and a mouth boundary from a face image is deformed, and the deformed skin model is blended with an eyeball model and an inside-of-mouth model by α blending, considering that the eyeball model and the inside-of-mouth model are at the back of the skin model. Accordingly, a blended face image is generated. With this method, a natural blended face image can be obtained by preventing generation of an unnatural blended face image, in which the shapes of eyeballs and the inside of the mouth change with a change of expression of the face.

Also, in the face image generating process performed by the animation processing unit 125, the blending parameter β indicating the level of blending the smiling face deformed skin model and the expressionless face deformed skin model is set so as to match with the deformation level v if the deformation level v is 0 or 1. Thus, the blending parameter β is set to 0 when the deformation level v is 0, so that the blended face image (substantially) matches with the expressionless face image. On the other hand, the blending parameter β is set to 1 when the deformation level v is 1, so that the blended face image (substantially) matches with the smiling face image. Accordingly, an image similar to (same as) a person of an expressionless face image or a smiling face image can be obtained.

If a skin model is deformed by using a deforming method based on the principle of expression generation, a more natural blended face image (intermediate image) can be obtained.

In this embodiment, two-dimensional models are adopted as a skin model, an eyeball model, and an inside-of-mouth model. However, three-dimensional models can also be adopted as the skin model, the eyeball model, and the inside-of-mouth model. In that case, not only animation of changing an expression but also animation of changing the orientation of a face and a line of sight can be realized.

In this embodiment, the animation data generating process and the face image generating process are performed by using two face images: a smiling face image and an expressionless face image. However, the animation data generating process and the face image generating process can be performed by using three or more face images, e.g., a smiling face image, an expressionless face image, and a crying face image. In that case, for example, animation changing from a smiling face to an expressionless face, from an expressionless face to a crying face, or from a crying face to a smiling face, can be realized.

In the face image generating process, a hidden-surface (-line) removing technique as well as the α blending can be adopted as a method of blending a skin model with an eyeball model and an inside-of-mouth model, performed under consideration of that the eyeball model and the inside-of-mouth model are at the back of the skin model.

The face image may be an image of a face of an animal other than a human.

In this specification, steps describing a program allowing a computer to execute various processes are not necessarily performed in time series in accordance with the order described in the flowchart, but may be performed in parallel or individually.

The program may be executed by a computer or may be executed by a plurality of computers in a distributed manner. The program may be executed after being transferred to a remote computer.

The above-described series of processes can be performed by allowing the computer shown in FIG. 1 to execute the program or by a dedicated hardware.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus generating animation data to generate a face image of a different expression on the basis of a face image, the image processing apparatus comprising:

first eyes-and-mouth detecting means for detecting eye boundaries between eyeballs and eyelids where eyeballs are exposed and a mouth boundary between lips and the inside of a mouth from a first face image, which is a face image of a first expression;

second eyes-and-mouth detecting means for detecting eye boundaries and a mouth boundary from a second face image, which is a face image of a second expression different from the first expression;

first skin model generating means for generating a first skin model, which is a face model generated by removing only the inside of the eye boundaries and the inside of the mouth boundary from the first face image;

second skin model generating means for generating a second skin model, which is a face model generated by removing only the inside of the eye boundaries and the inside of the mouth boundary from the second face image;

inside-of-mouth model generating means for generating an inside-of-mouth model, which is a model of the inside of the mouth boundary;

eyeball model generating means for generating an eyeball model, which is a model of eyeballs;

first deformation parameter generating means for generating a first deformation parameter used to deform the first skin model to the second skin model;

second deformation parameter generating means for generating a second deformation parameter used to deform the second skin model to the first skin model; and output means for outputting the first and second skin models, the first and second deformation parameters, the inside-of-mouth model, and the eyeball model as the animation data.

2. The image processing apparatus according to claim 1, wherein the first face image is a smiling face image,
wherein the second face image is an expressionless face image,
wherein the inside-of-mouth model generating means generates the inside-of-mouth model by extracting the inside of the mouth boundary of the smiling face image as the inside-of-mouth model, and
wherein the eyeball model generating means generates the eyeball model by adapting a standard model of eyeballs to the expressionless face image.

3. The image processing apparatus according to claim 1, further comprising:

deformation level setting means for setting a deformation level indicating a level of deformation from one of the first and second expressions to the other;

first skin model deforming means for deforming the first skin model to a first deformed skin model in accordance with the deformation level by using the first deformation parameter;

second skin model deforming means for deforming the second skin model to a second deformed skin model in accordance with the deformation level by using the second deformation parameter;

blending parameter setting means for setting a blending parameter indicating a level of blending the first and second deformed skin models in accordance with the deformation level;

skin model blending means for blending the first and second deformed skin models in accordance with the blending parameter so as to generate a blended skin model; and face image generating means for generating a face image of an expression according to the deformation level by blending the blended skin model, the inside-of-mouth model, and the eyeball model.

4. The image processing apparatus according to claim 3, wherein the deformation level setting means sets the deformation level in accordance with an operation performed by a user.

5. An image processing method for generating animation data to generate a face image of a different expression on the basis of a face image, the image processing method comprising the steps of:

detecting eye boundaries between eyeballs and eyelids where eyeballs are exposed and a mouth boundary between lips and the inside of a mouth from a first face image, which is a face image of a first expression;

detecting eye boundaries and a mouth boundary from a second face image, which is a face image of a second expression different from the first expression;

generating a first skin model, which is a face model generated by removing only the inside of the eye boundaries and the inside of the mouth boundary from the first face image;

generating a second skin model, which is a face model generated by removing only the inside of the eye boundaries and the inside of the mouth boundary from the second face image;

generating an inside-of-mouth model, which is a model of the inside of the mouth boundary;

generating an eyeball model, which is a model of eyeballs;

generating a first deformation parameter used to deform the first skin model to the second skin model;

generating a second deformation parameter used to deform the second skin model to the first skin model; and outputting the first and second skin models, the first and second deformation parameters, the inside-of-mouth model, and the eyeball model as the animation data.

6. A program, tangibly embodied in a non-transitory computer-readable storage medium, allowing a computer to execute image processing of generating animation data to generate a face image of a different expression on the basis of a face image, the image processing comprising the steps of:

detecting eye boundaries between eyeballs and eyelids where eyeballs are exposed and a mouth boundary between lips and the inside of a mouth from a first face image, which is a face image of a first expression;

detecting eye boundaries and a mouth boundary from a second face image, which is a face image of a second expression different from the first expression;

generating a first skin model, which is a face model generated by removing only the inside of the eye boundaries and the inside of the mouth boundary from the first face image;

generating a second skin model, which is a face model generated by removing only the inside of the eye boundaries and the inside of the mouth boundary from the second face image;

generating an inside-of-mouth model, which is a model of the inside of the mouth boundary;

generating an eyeball model, which is a model of eyeballs;

generating a first deformation parameter used to deform the first skin model to the second skin model;

generating a second deformation parameter used to deform the second skin model to the first skin model; and outputting the first and second skin models, the first and second deformation parameters, the inside-of-mouth model, and the eyeball model as the animation data.

7. An image processing apparatus to generate a face image, the image processing apparatus comprising:

data obtaining means for obtaining animation data including a first skin model, which is a face model generated by removing only the inside of eye boundaries between eyeballs and eyelids where eyeballs are exposed and the inside of a mouth boundary between lips and the inside of a mouth from a first face image, which is a face image of a first expression;

a second skin model, which is a face model generated by removing only the inside of eye boundaries and the inside of a mouth boundary from a second face image, which is a face image of a second expression different from the first expression;

an inside-of-mouth model, which is a model of the inside of the mouth boundary;

an eyeball model, which is a model of eyeballs;

a first deformation parameter used to deform the first skin model to the second skin model; and a second deformation parameter used to deform the second skin model to the first skin model;

deformation level setting means for setting a deformation level indicating a level of deformation from one of the first and second expressions to the other;

first skin model deforming means for deforming the first skin model to a first deformed skin model in accordance with the deformation level by using the first deformation parameter;

second skin model deforming means for deforming the second skin model to a second deformed skin model in accordance with the deformation level by using the second deformation parameter;

blending parameter setting means for setting a blending parameter indicating a level of blending the first and second deformed skin models in accordance with the deformation level;

skin model blending means for blending the first and second deformed skin models in accordance with the blending parameter so as to generate a blended skin model; and face image generating means for generating a face image of an expression according to the deformation level by blending the blended skin model, the inside-of-mouth model, and the eyeball model.

8. The image processing apparatus according to claim 7, wherein the first face image is a smiling face image, wherein the second face image is an expressionless face image, wherein the inside-of-mouth model is the inside of the mouth boundary of the smiling face image, and wherein the eyeball model is generated by adapting a standard model of eyeballs to the expressionless face image.

9. The image processing apparatus according to claim 7,
wherein the deformation level setting means sets the deformation level in accordance with an operation performed by a user.

10. The image processing apparatus according to claim 7,
wherein the deformation level setting means sets the deformation level,
wherein the blending parameter setting means sets the blending parameter in accordance with the deformation level,
wherein the first skin model deforming means deforms the first skin model to the first deformed skin model in accordance with the deformation level,
wherein the second skin model deforming means deforms the second skin model to the second deformed skin model in accordance with the deformation level,
wherein the skin model blending means blends the first and second deformed skin models in accordance with the blending parameter so as to generate a blended skin model, and
wherein the face image generating means blends the blended skin model, the inside-of-mouth model, and the eyeball model so as to generate a face image of an expression according to the deformation level,
these processes being repeated.

11. An image processing method for generating a face image, the image processing method comprising the steps of:
  obtaining animation data including
    a first skin model, which is a face model generated by removing only the inside of eye boundaries between eyeballs and eyelids where eyeballs are exposed and the inside of a mouth boundary between lips and the inside of a mouth from a first face image, which is a face image of a first expression;
    a second skin model, which is a face model generated by removing only the inside of eye boundaries and the inside of a mouth boundary from a second face image, which is a face image of a second expression different from the first expression;
    an inside-of-mouth model, which is a model of the inside of the mouth boundary;
    an eyeball model, which is a model of eyeballs;
    a first deformation parameter used to deform the first skin model to the second skin model; and
    a second deformation parameter used to deform the second skin model to the first skin model;
  setting a deformation level indicating a level of deformation from one of the first and second expressions to the other;
  deforming the first skin model to a first deformed skin model in accordance with the deformation level by using the first deformation parameter;
  deforming the second skin model to a second deformed skin model in accordance with the deformation level by using the second deformation parameter;
  setting a blending parameter indicating a level of blending the first and second deformed skin models in accordance with the deformation level;
  blending the first and second deformed skin models in accordance with the blending parameter so as to generate a blended skin model; and
  generating a face image of an expression according to the deformation level by blending the blended skin model, the inside-of-mouth model, and the eyeball model.

12. A program, tangibly embodied in a non-transitory computer-readable storage medium, allowing a computer to execute image processing to generate a face image, the image processing comprising the steps of:
  obtaining animation data including
    a first skin model, which is a face model generated by removing only the inside of eye boundaries between eyeballs and eyelids where eyeballs are exposed and the inside of a mouth boundary between lips and the inside of a mouth from a first face image, which is a face image of a first expression;
    a second skin model, which is a face model generated by removing only the inside of eye boundaries and the inside of a mouth boundary from a second face image, which is a face image of a second expression different from the first expression;
    an inside-of-mouth model, which is a model of the inside of the mouth boundary;
    an eyeball model, which is a model of eyeballs;
    a first deformation parameter used to deform the first skin model to the second skin model; and
    a second deformation parameter used to deform the second skin model to the first skin model;
  setting a deformation level indicating a level of deformation from one of the first and second expressions to the other;
  deforming the first skin model to a first deformed skin model in accordance with the deformation level by using the first deformation parameter;
  deforming the second skin model to a second deformed skin model in accordance with the deformation level by using the second deformation parameter;
  setting a blending parameter indicating a level of blending the first and second deformed skin models in accordance with the deformation level;
  blending the first and second deformed skin models in accordance with the blending parameter so as to generate a blended skin model; and
  generating a face image of an expression according to the deformation level by blending the blended skin model, the inside-of-mouth model, and the eyeball model.

13. A tangible, non-transitory computer-readable storage medium product having a data configuration of animation data to generate a face image stored therein, the data configuration comprising:
  a first skin model, which is a face model generated by removing only the inside of eye boundaries between eyeballs and eyelids where eyeballs are exposed and the inside of a mouth boundary between lips and the inside of a mouth from a first face image, which is a face image of a first expression;
  a second skin model, which is a face model generated by removing only the inside of eye boundaries and the inside of a mouth boundary from a second face image, which is a face image of a second expression different from the first expression;
  an inside-of-mouth model, which is a model of the inside of the mouth boundary;
  an eyeball model, which is a model of eyeballs;
  a first deformation parameter used to deform the first skin model to the second skin model; and
  a second deformation parameter used to deform the second skin model to the first skin model.

14. An image processing apparatus generating animation data to generate a face image of a different expression on the basis of a face image, the image processing apparatus comprising:
  a first eyes-and-mouth detecting unit configured to detect eye boundaries between eyeballs and eyelids where eyeballs are exposed and a mouth boundary between lips and the inside of a mouth from a first face image, which is a face image of a first expression;

a second eyes-and-mouth detecting unit configured to detect eye boundaries and a mouth boundary from a second face image, which is a face image of a second expression different from the first expression;

a first skin model generating unit configured to generate a first skin model, which is a face model generated by removing only the inside of the eye boundaries and the inside of the mouth boundary from the first face image;

a second skin model generating unit configured to generate a second skin model, which is a face model generated by removing only the inside of the eye boundaries and the inside of the mouth boundary from the second face image;

an inside-of-mouth model generating unit configured to generate an inside-of-mouth model, which is a model of the inside of the mouth boundary;

an eyeball model generating unit configured to generate an eyeball model, which is a model of eyeballs;

a first deformation parameter generating unit configured to generate a first deformation parameter used to deform the first skin model to the second skin model;

a second deformation parameter generating unit configured to generate a second deformation parameter used to deform the second skin model to the first skin model; and an output unit configured to output the first and second skin models, the first and second deformation parameters, the inside-of-mouth model, and the eyeball model as the animation data.

15. An image processing apparatus to generate a face image, the image processing apparatus comprising:

a data obtaining unit configured to obtain animation data including a first skin model, which is a face model generated by removing only the inside of eye boundaries between eyeballs and eyelids where eyeballs are exposed and the inside of a mouth boundary between lips and the inside of a mouth from a first face image, which is a face image of a first expression;

a second skin model, which is a face model generated by removing only the inside of eye boundaries and the inside of a mouth boundary from a second face image, which is a face image of a second expression different from the first expression;

an inside-of-mouth model, which is a model of the inside of the mouth boundary;

an eyeball model, which is a model of eyeballs;

a first deformation parameter used to deform the first skin model to the second skin model; and a second deformation parameter used to deform the second skin model to the first skin model;

a deformation level setting unit configured to set a deformation level indicating a level of deformation from one of the first and second expressions to the other;

a first skin model deforming unit configured to deform the first skin model to a first deformed skin model in accordance with the deformation level by using the first deformation parameter;

a second skin model deforming unit configured to deform the second skin model to a second deformed skin model in accordance with the deformation level by using the second deformation parameter;

a blending parameter setting unit configured to set a blending parameter indicating a level of blending the first and second deformed skin models in accordance with the deformation level;

a skin model blending unit configured to blend the first and second deformed skin models in accordance with the blending parameter so as to generate a blended skin model; and a face image generating unit configured to generate a face image of an expression according to the deformation level by blending the blended skin model, the inside-of-mouth model, and the eyeball model.

* * * * *